(12) United States Patent
Kushimoto

(10) Patent No.: US 10,230,779 B2
(45) Date of Patent: Mar. 12, 2019

(54) CONTENT PROVISION SYSTEM, INFORMATION PROCESSING APPARATUS AND CONTENT REPRODUCTION METHOD

(71) Applicant: Kei Kushimoto, Kanagawa (JP)

(72) Inventor: Kei Kushimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 388 days.

(21) Appl. No.: 15/135,686

(22) Filed: Apr. 22, 2016

(65) Prior Publication Data
US 2016/0344783 A1 Nov. 24, 2016

(30) Foreign Application Priority Data
May 20, 2015 (JP) ................................. 2015-102622

(51) Int. Cl.
| | |
|---|---|
| H04L 29/06 | (2006.01) |
| H04N 21/2743 | (2011.01) |
| H04N 21/45 | (2011.01) |
| H04N 5/28 | (2006.01) |

(52) U.S. Cl.
CPC ...... *H04L 65/4092* (2013.01); *H04L 65/4084* (2013.01); *H04N 21/2743* (2013.01); *H04N 21/4524* (2013.01); *H04N 5/28* (2013.01)

(58) Field of Classification Search
CPC ... H04L 65/4084; H04L 65/4092; H04N 5/28; H04N 21/2743; H04N 21/4524
See application file for complete search history.

(56) References Cited

U.S. PATENT DOCUMENTS

| | | | | |
|---|---|---|---|---|
| 8,913,083 | B1* | 12/2014 | Ogale | G06F 17/30241 |
| | | | | 345/632 |
| 2012/0262552 | A1* | 10/2012 | Zhang | G06F 17/30855 |
| | | | | 348/47 |

(Continued)

FOREIGN PATENT DOCUMENTS

| | | |
|---|---|---|
| JP | 2008-241875 | 10/2008 |
| WO | 2010/150348 | 12/2010 |

OTHER PUBLICATIONS

Office Action dated Dec. 11, 2018 issued with respect to the corresponding Japanese Patent Application No. 2015-102622.

*Primary Examiner* — Gil H. Lee
(74) *Attorney, Agent, or Firm* — IPUSA, PLLC

(57) ABSTRACT

There is provided a content provision system including an information processing apparatus and a terminal device wherein the information processing apparatus provides a content that includes images respectively captured at discrete capturing locations to the terminal device, the information processing apparatus comprising: a retrieving unit configured to retrieve the content and a position information item associated with the content; and a transmission unit configured to transmit the content and the position information item to the terminal device; the terminal device comprising: a reception unit configured to receive the content and the position information item; and a content reproduction unit configured to reproduce the content by selecting an image to be displayed and displaying a partial area of the selected image, the displayed partial area being extracted from the selected image to show a view in a direction of the designated position for at least one of the images.

9 Claims, 28 Drawing Sheets

(56) References Cited

U.S. PATENT DOCUMENTS

2013/0326407 A1* 12/2013 van Os ................ G01C 21/00
                                                        715/810
2015/0261785 A1*  9/2015 Ma ..................... G06F 3/1407
                                                        345/629

* cited by examiner

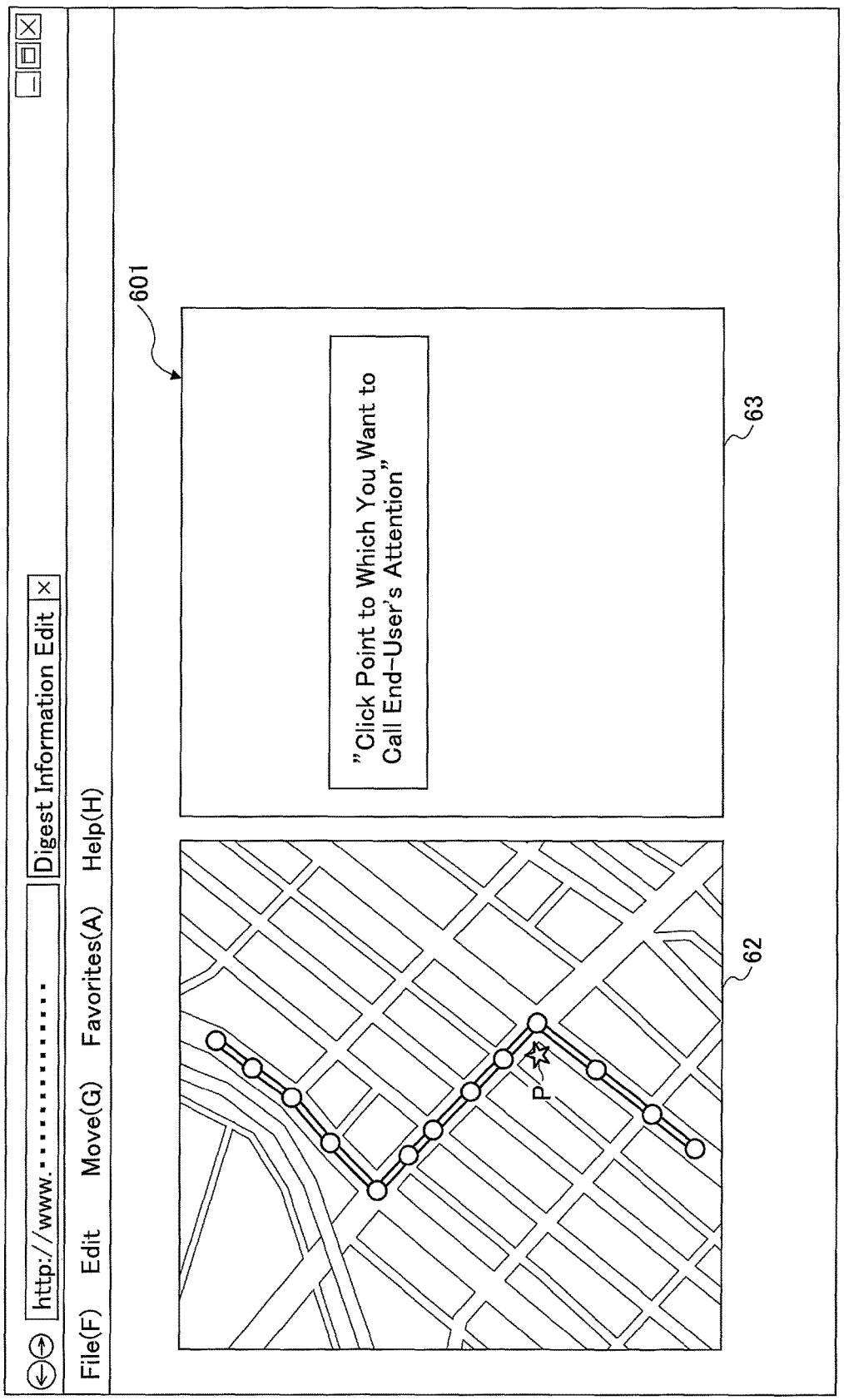

CONTENT PROVISION SYSTEM, INFORMATION PROCESSING APPARATUS AND CONTENT REPRODUCTION METHOD

BACKGROUND OF THE INVENTION

1. Field of the Invention

The present disclosure relates to content provision systems, information processing apparatuses and content reproduction methods.

2. Description of the Related Art

In a video posting site, etc., various video images are uploaded in the internet, and are allowed to be freely seen by users. Such video image contents include video images created by capturing images of, scenes while a capturing device is moving. For example, a video image captured by a user walking along a scenic route, a video image captured from a traveling vehicle (including an accident record image such as an image captured by a drive-recorder), a video image captured during bicycle riding, a video image captured during skiing or snowboarding, a video image captured from moving machine such as a ship, etc., are included.

However, such video images are likely to seem boring, and it may be hard for users to see those video images from start to finish. Therefore, a technology has been developed, in which a video image is summarized for reproduction (e.g., Patent Document 1). In Patent Document 1, an image capturing/reproducing apparatus is disclosed, which captures a video image around a traveling object, and determines importance of scenes to identify the importance of the respective scenes. The image capturing/reproducing apparatus summarizes the video image by generating a schedule for digest reproduction.

However, the technology of Patent Document 1 does not take account which portion of a frame of the captured video image includes important items. For example, the frame includes images of scenery within the entire viewing angle. However, the important item is not always captured across the entire range of the frame. Therefore, it may be difficult for a user to recognize a portion of frame that is to be seen when he or she plays the digest reproduction.

Also, recently, an image capturing device that can capture a 360° image by one capturing operation becomes popular according to developed optical and image processing technology. A spherical image captured by such an image capturing device is difficult to be entirely displayed on a display screen at once. For example, in a case where an important object is captured at north side of the scene while another object is captured at south side of the scene, a user may be unable to recognize the important object. Thus, as for moving image of the spherical image, it is very important which portion of the spherical image the user watches. However, an effective reproduction method is not developed in the conventional technologies.

RELATED ART DOCUMENT

Patent Document

[Patent Document 1]: WO2010/150348

SUMMARY OF THE INVENTION

An object of the present disclosure is to provide a digest content provision system that displays an object to be seen as desired by a creator of the content.

The following is adopted to achieve the object.

In one aspect of the embodiments of the present invention, there is provided a content provision system including an information processing apparatus and a terminal device wherein the information processing apparatus provides a content that includes a plurality of images respectively captured at discrete capturing locations to the terminal device, the information processing apparatus comprising: a retrieving unit configured to retrieve the content from a content storage device for storing the content, and a position information item associated with the content from a position information storage device for storing the position information item, the position information item defining a designated position; and a transmission unit configured to transmit the retrieved content and the retrieved position information item to the terminal device; the terminal device comprising: a reception unit configured to receive the content and the position information item; and a content reproduction unit configured to reproduce the content by successively selecting an image to be displayed from the images included in the content and displaying a partial area of the selected image, the displayed partial area being extracted from the selected image to show a view in a direction of the designated position for at least one of the images that is identified based on a distances between the designated position and a capturing location of the at least one of the images.

Other objects, features and advantages of the present invention will become more apparent from the following detailed description when read in conjunction with the accompanying drawings.

BRIEF DESCRIPTION OF THE DRAWINGS

FIG. 9 is a diagram illustrating an example digest information change screen displayed by a creator PC.

DETAILED DESCRIPTION OF THE PREFERRED EMBODIMENTS

Herein below, embodiments will be described with reference to the accompanying drawings.

First Embodiment

Display Method of Video Image

Figure 1:
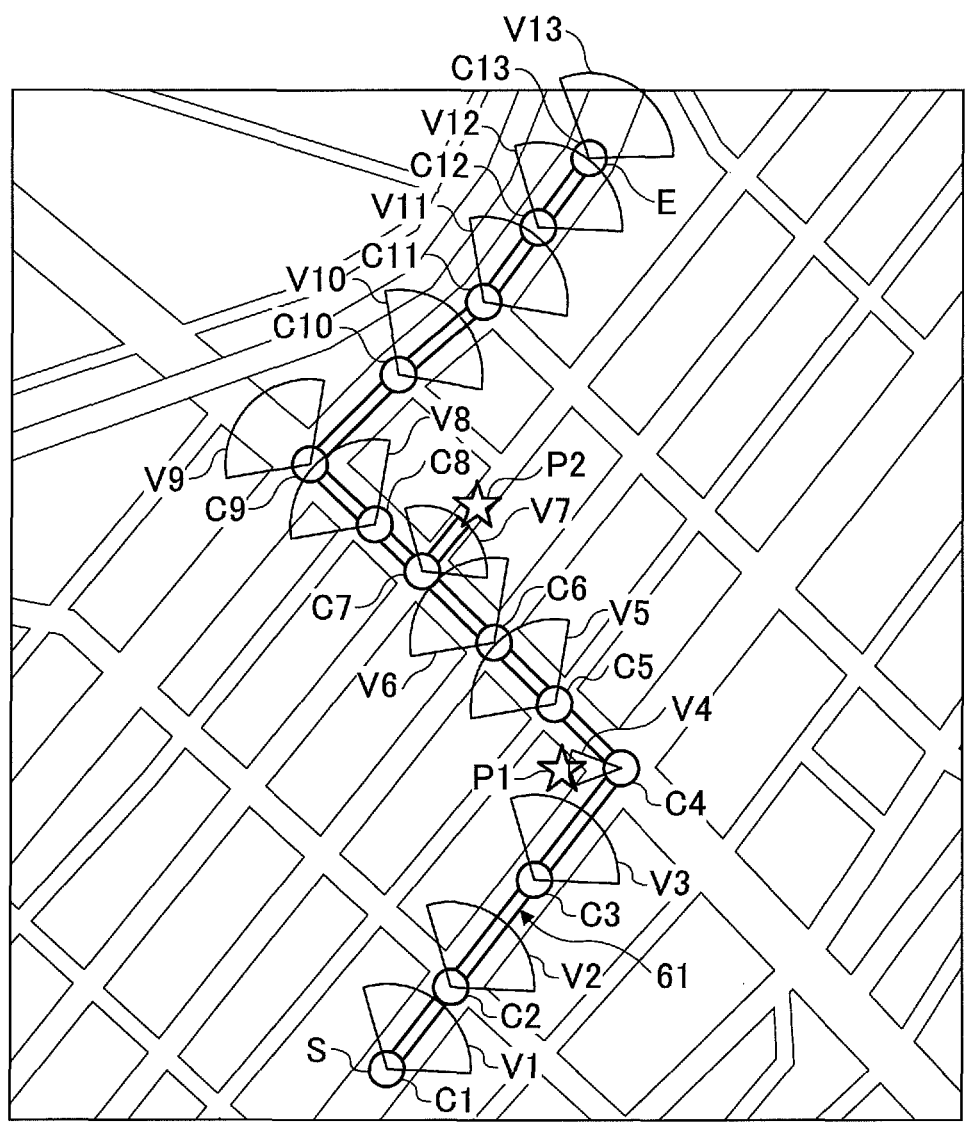
FIG. 1 is a diagram illustrating an example content reproduction method of a first embodiment.

FIG. 1 is a diagram illustrating an example content reproduction method of the present embodiment. In this content, a video image of spherical image captured by a user moving on a route 61 from a spot S to a spot E is included, where the spherical image is a wide range image of 360° around the user. The video image includes a plurality of frames, where at least frames captured at capturing points C1-C13 shown in FIG. 1 are included in the plurality of frames. Also, in the video image, designated points P1 and P2 are set, where the designated point is designated by a creator of the content (content creator) to be a point to be watched by an end-user. A user PC (Personal Computer) (described below) displays the content in a manner described in the following: (i) Spherical images at capturing points C1-C3: the user PC displays the spherical images within display ranges V1-V3 in a display of the user PC, etc., where a traveling direction of a capturing device is set to be an eye direction. The display ranges V1-V3 are respectively capable of being displayed in the display screen, and the display ranges may not be uniform. (ii) Spherical images at capturing points C4: the capturing point C1 is positioned closest to the designated point P1. The user PC displays the spherical images within display range V4 in a display of the user PC, etc., where a line connecting the capturing point C4 and the designated point P1 is set to be an eye direction. (iii) Spherical images at capturing points C5 and C6; the user PC displays the spherical images within display ranges V5 and V6 in a display of the user PC, etc., where a traveling direction of a capturing device is set to be an eye direction. (iv) Spherical images at capturing points C7: the capturing point C7 is positioned closest to the designated point P2. The user PC displays the spherical images within display range V7 in a display of the user PC, etc., where a line connecting the capturing point C7 and the designated point P2 is set to be an eye direction. (v) Spherical images at capturing points C8-C13; the user PC displays the spherical images within display ranges V8-V13 in a display of the user PC, etc., where a traveling direction of a capturing device 11 is set to be an eye direction.

In this way, designated points P1 and P2 to which the content creator intends to call the end-user's attention are set in the video image of the present embodiment. When the frames captured at the capturing points C4 and C7 that are positioned closest to the designated points P1 and P2 are displayed by the user PC, display ranges V including the designated points P1 and P2 viewed in the eye direction from the capturing points C4 and C7 are displayed. Therefore, in a case where a wide range image, such as a spherical image, which cannot be entirely displayed at once is displayed by the user PC, the designated points P1 and P2 call the end-user's attention as desired by the content creator.

A content reproduction method, in which images including the designated points P1 and P2 are displayed corresponding to the capturing points close to the designated points, is referred to digest reproduction. Also, the respective designated points may be referred to as digest information.

<Schematic Process to Post Content>

Figure 2:
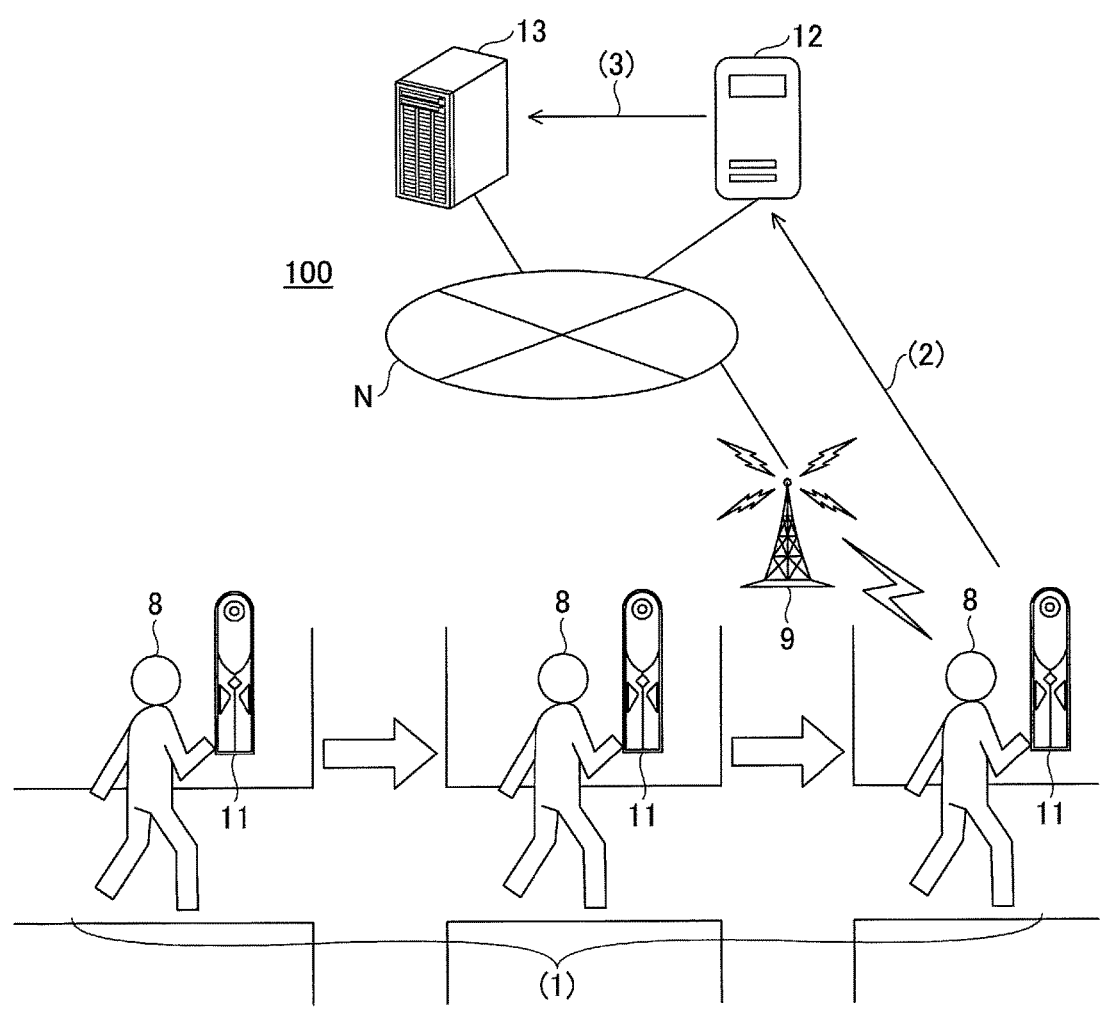
FIG. 2 is a diagram illustrating example actions of a content creator.

In the following, a process to post the content will be described with reference to FIG. 2. FIG. 2 is a diagram illustrating example actions of the content creator.

(1) A videographer/photographer 8 walks holding a capturing device 11 capable of capturing a wide range image of 360°. The capturing device 11 is set to capture an image in every predetermined period or in every predetermined distance, and the captured spherical image is recorded associated with the capturing point. Therefore, images along a route walked by the videographer/photographer 8 are captured. Additionally, the videographer/photographer 8 may capture the images traveling with a machine such as a vehicle.

(2) When the image capturing on the route to the destination is finished, the videographer/photographer 8 transmits a plurality of images to a content creation server 12 via an access point 9.

(3) The content creation server 12 create a content using a map including the traveling route of the videographer/photographer 8 and the captured images, and registers the created content in a content provision server 13. Additionally, in a case where the capturing device 11 does not include a communication function, a mobile terminal having received the captured images from the capturing device 11 transmits the images to the content creation server 12.

Figure 3:
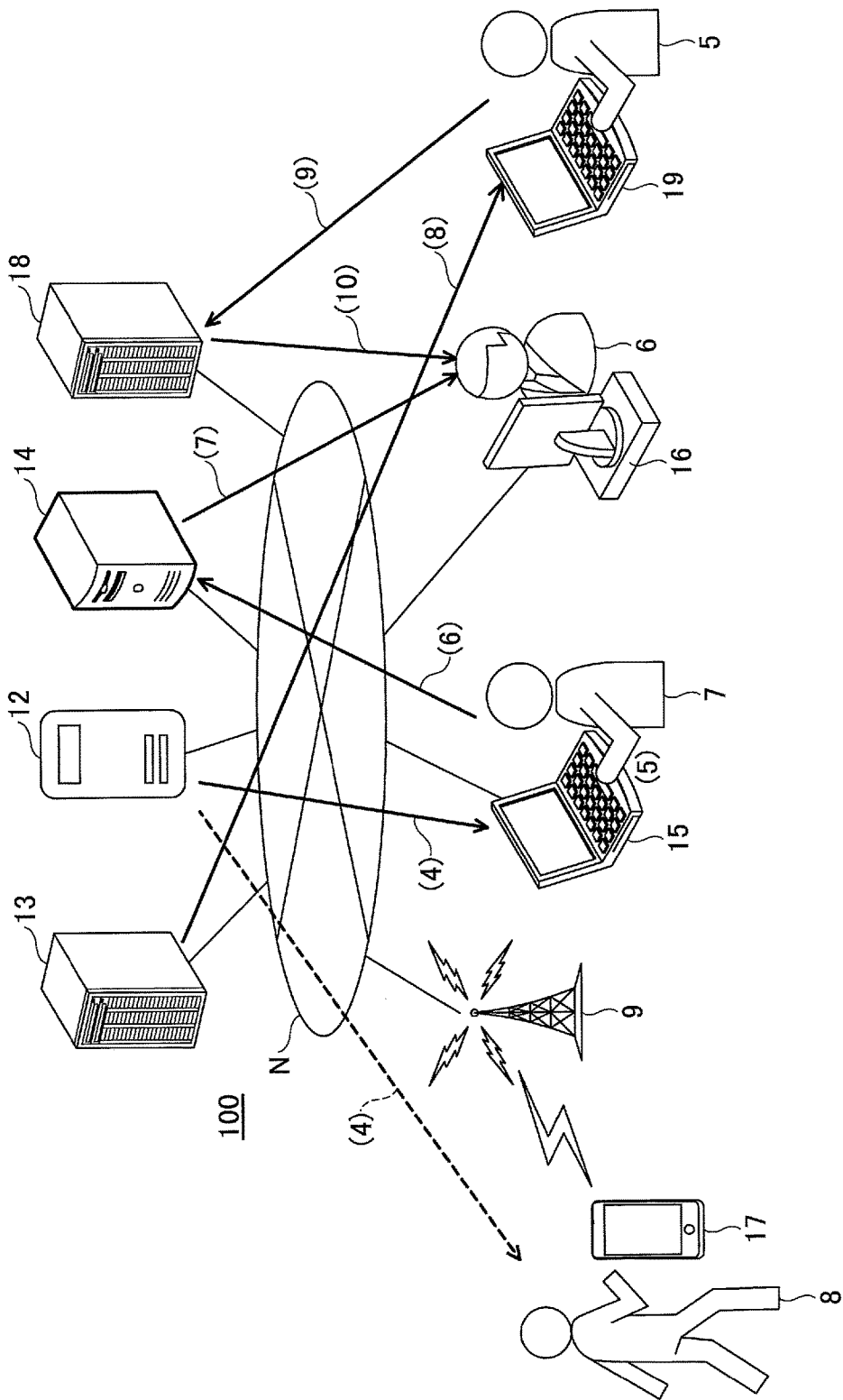
FIG. 3 is a diagram illustrating an example content setting method and example digest information edit method.

FIG. 3 is a diagram illustrating an example content setting method and example digest information edit method.

(4) The content creation server 12 creates the content to put it in the content provision server 13, and transmits an URI (Uniform Resource Identifier) of the content to an operator 7 in a content user company that has been registered in advance. Additionally, as shown with a dotted line (4) in FIG. 3, the URL may be transmitted to the videographer/photographer 8 (mobile terminal 17 of videographer/photographer 8 in FIG. 3) who has been transmitted the captured images.

(5) The operator 7 of the content user company operates a company PC 15 to add the URI of the content to HTML data of a web page (e.g., homepage) of the content user company (e.g., by copy and paste operation). Thus, the content of the spherical images captured along the route walked by the videographer/photographer 8 can be linked to the web page of the content user company.

(6) The operator 7 of the content user company puts the web page in a web server 14 of the own company. Thus, an end-user 6 can display the web page of the content user company linked to the content.

(7) The end-user 6 viewing the web page of the content user company operates a user PC 16 to display the content.

(8) A content creator 5 operates a creator PC 19 (example of information terminal) to acquire the content from the content provision server 13 in order to create the digest information. The content creator 5 sets the digest information in the content. Generally, the designated points P1 and P2 and frame IDs of the spherical images captured at the closest capturing points correspond to the digest information. Additionally, the content creator 5 may be the same person as the videographer/photographer 8 or the operator 7 of the content user company. The creator PC 19 may be the same PC as the company PC 15.

(9) The content creator 5 transmits the digest information to a digest management server 18. Additionally, the digest management server 18 may be the same server as the content provision server 13.

(10) The end-user 6 operates a user PC 16 to acquire the content and the digest information. Thus, the user PC 16 can perform the digest reproduction of the content as described with reference to FIG. 1.

<Example Configuration>

Figure 4:
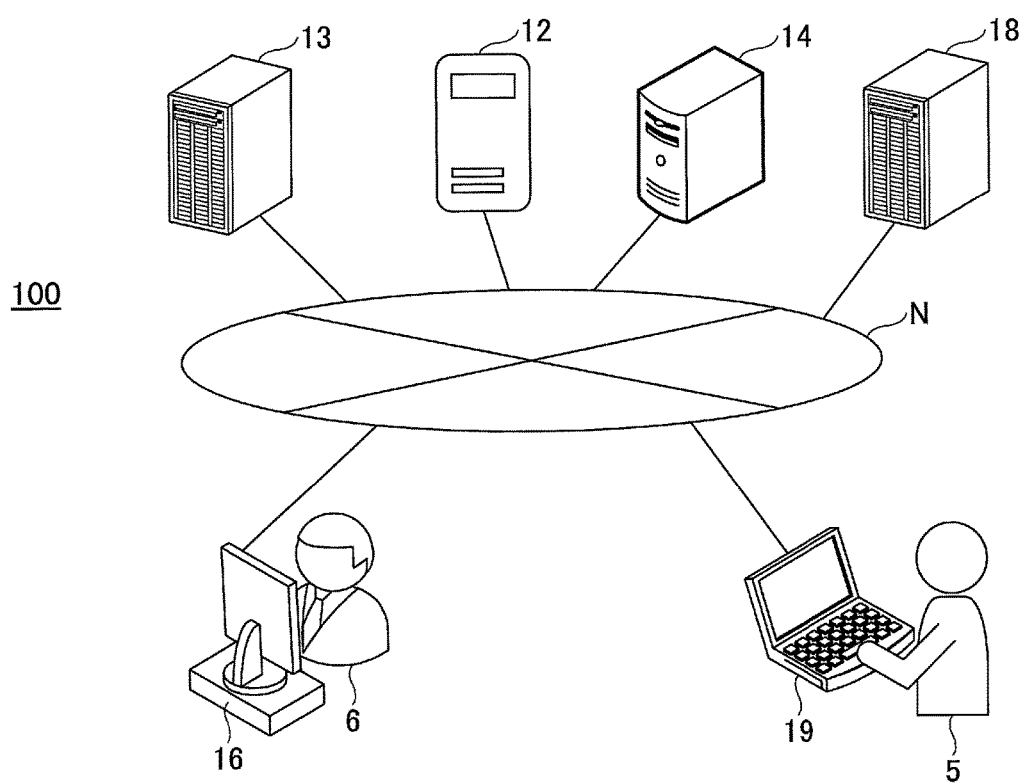
FIG. 4 is a diagram illustrating an example system configuration of a content provision system.

FIG. 4 is a diagram illustrating an example system configuration of a content provision system 100. The content provision system 100 includes the content creation server 12, the content provision server 13, the web server 14, the digest management server 18, the user PC 16 and the creator PC 19, which can communicate each other through a network N. Additionally, the capturing device 11, the mobile terminal 17 held by the videographer/photographer 8 and the company PC 15 will be described in the present embodiment if needed.

The network N is configured by a LAN provided in an office building, etc., in which the creator PC 19 is disposed, a provider network for connecting the LAN to the internet and dedicated lines provided by a telecommunication carrier. The internet may be included in the network N. The network N may be wired or wireless or a combination thereof. Also, the creator PC 19 may be connected to the provider network without connecting to the LAN in a case where the creator PC 19 is directly connected to a telephone network or a mobile phone network.

As described above, the content creation server 12 is a server for creating the content using the spherical images. The content provision server 13 stores the content and provides it to the end-user 6 in response to a request. The web page server 14 is operated by the content user company, and the web page of the content user company is registered in the web page server 14. The digest management server 18 manages at least a digest information item associated with the content. The content may be stored in the digest management server 18.

The user PC 16 is operated by the end-user 6, and displays the web page and the content provided by the content user company. The creator PC 19 is operated by the content creator 5 who sets the digest information in the content. A highlight (scene to call attention) or highlights of the content has been known by the content creator 5 or has been instructed to the content creator 5. The creator PC 19 may be a smartphone, a PDA (Personal Digital Assistance), a tablet terminal, a mobile phone, a wearable PC, etc., as well as a PC.

Additionally, in FIG. 4, the content creation server 12, the content provision server 13, the web server 14 and the digest management server 18 are shown as discrete apparatuses for convenience of explanation. However, functions of these 4 servers may be integrated into 1-3 servers. Alternatively, the functions of these 4 servers may be divided to five or more servers.

Also, one or more functions of the content creation server 12, the content provision server 13, the web server 14 and the digest management server 18 may be provided as cloud service using cloud computing technology. According to the cloud computing technology, virtual servers are added or released in accordance with a workload, and a server configuration is changed dynamically.

The configuration of the content provision system 100 shown in FIG. 4 is not a limiting example, and another configuration may adopted as long as it includes functions of information processing apparatus capable of performing processes of the embodiment described below.

<Hardware Configuration of Content Creation Server 12, Content Provision Server 13, Web Server 14, User PC 16, Digest Management Server 18 and Creator PC 19>

Figure 5:
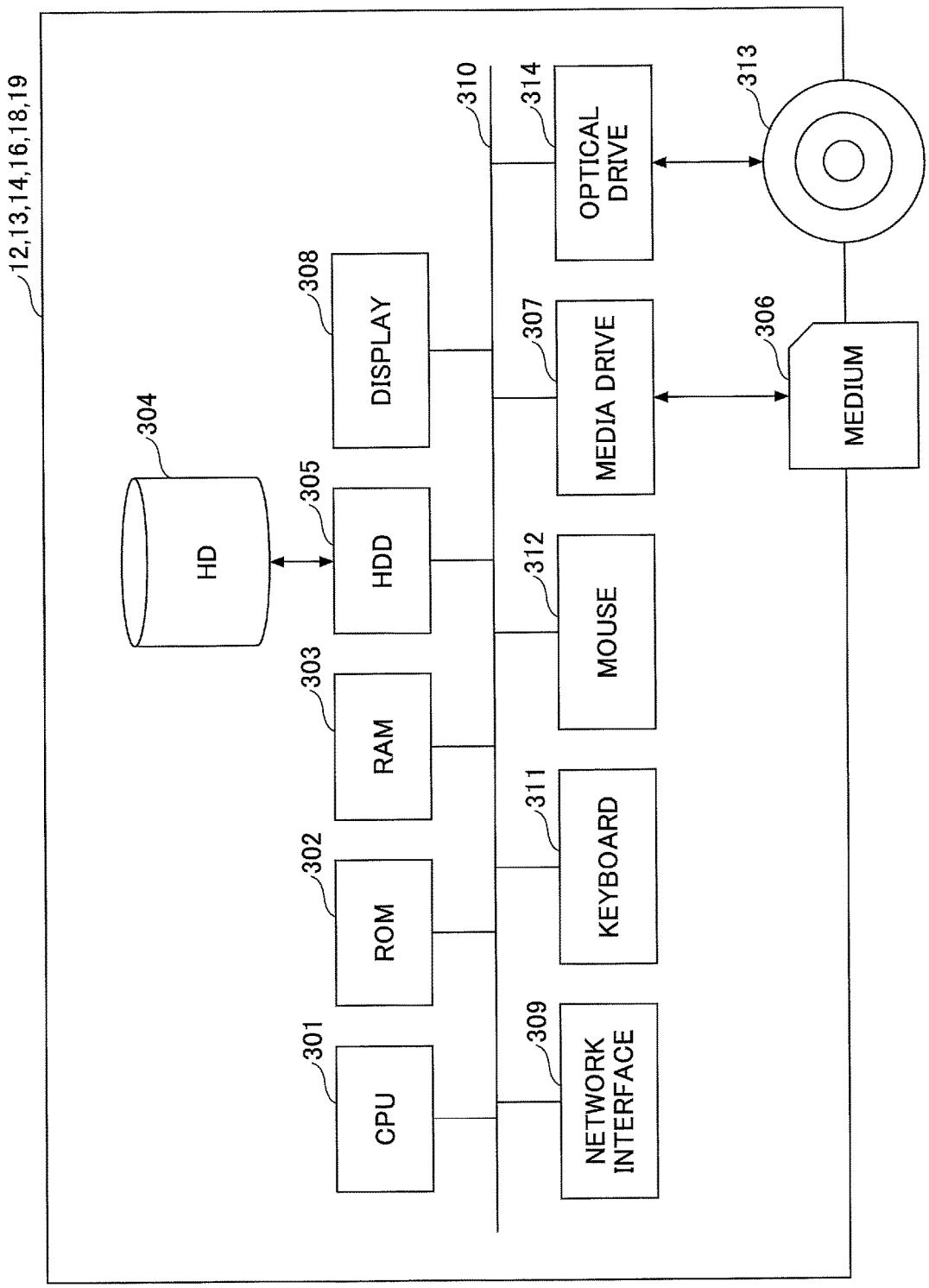
FIG. 5 is a block diagram illustrating an example hardware configuration of a digest management server.

FIG. 5 is a block diagram illustrating an example hardware configuration of the digest management server 18. Additionally, the hardware configuration of the digest management server 18 shown in FIG. 5 may not be integrated in a housing of an apparatus. It illustrates hardware elements preferably included in the digest management server 18.

The digest management server 18 includes a CPU 301, a ROM 302, a RAM 303, a HDD 305, a display 308, a network interface 309, a keyboard 311, a mouse 312, a media drive 307 and an optical drive 314 respectively connected to the bus 310. The CPU 301 executes a digest management program stored in the HD 304 to control entire operation of the digest management server 18. The ROM 302 stores programs such as IPL for starting processing of the CPU 301. The RAM 303 is used as a work area for the CPU 301. The HD 304 is a storage device including a non-volatile memory, and stores a digest management program for creating the content, an OS, and the like.

The HDD (Hard Disk Drive) 305 controls read/write operation of respective data from/into HD 304 in accordance with the control of the CPU 301. The display 308 displays information items such as a cursor, a mouse pointer, a window, a character, and an image. The network interface 309 is an interface to the network N such as a LAN or the internet.

The keyboard 311 and the mouse 312 are input/output devices. The keyboard 311 includes a plurality of keys for inputting characters, numbers, instructions, etc., and accepts the input thereof. The mouse 312 is used for moving the mouse pointer, for selecting instructions, for executing instructions, accepting a selection of an object to be processed, and the like.

The media drive 307 controls read/write (storage) operation of data from/into a medium 306 such as a flash memory. The optical drive 314 controls read/write operation of data from/into a CD (Compact Disc) 313 that is an example detachable recording medium, and the like.

Additionally, the digest management program may be stored in a computer readable recording medium such as the medium 306 and the CD 313 in an installable format or an executable format to be distributed. Or, the digest management program may be downloaded from a server type information processing apparatus and distributed.

Additionally, respective hardware configurations of the content creation server 12, the content provision server 13, the web server 14, the user PC 16 and the creator PC 19 are similar to that of the digest management server. Therefore, illustrations thereof are omitted. However, a content creation program for creating the content is stored in the HD 304 of the content creation server 12. Also, a content provision program for providing the content is stored in the HD 304 of the content provision server 13. Further, for example, a user PC program such as a browser for displaying the web page and the content is stored in the HD 304 of the user PC 16. Also, a digest information program (e.g., browser) for setting the digest information in the content is stored in the HD 304 of the creator PC 19.

<Function of Content Provision System>

Figure 6:
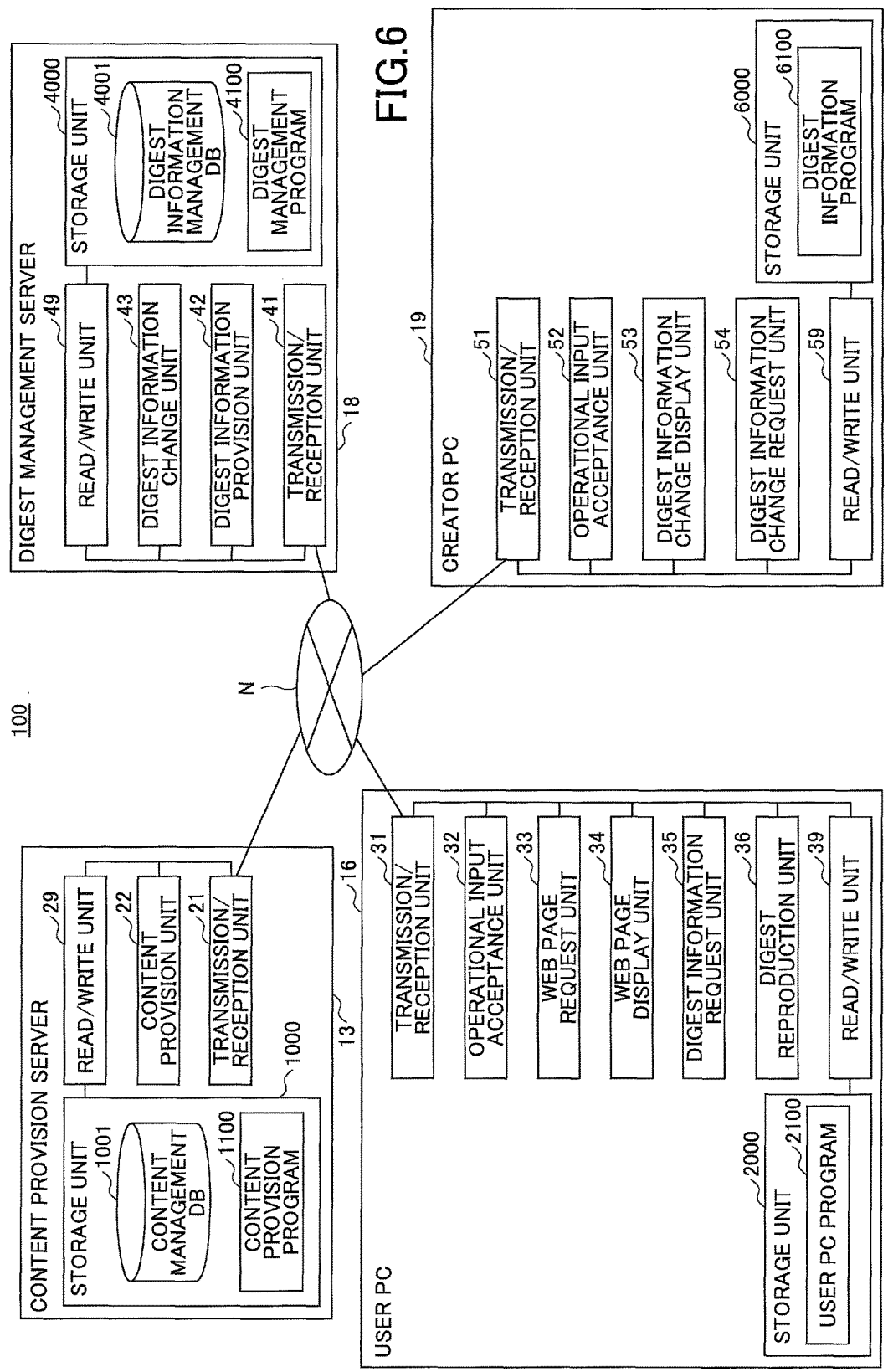
FIG. 6 is a block diagram illustrating a functional configuration of the content provision system.

FIG. 6 is a block diagram illustrating a functional configuration of the content provision system 100. In the following, apparatuses (content provision server 13, digest management server 18, user PC 16, creator PC 19) included in the content provision system 100 will be respectively described. The content creation server 12 and the web server 14 will be described if needed.

<Content Provision Server 13>

The content provision server 13 includes a transmission/reception unit 21, a content provision unit 22 and a read/write unit 29. The respective units included in the content provision server 13 are functions or means that are achieved by operations performed by any of elements shown in FIG. 5 in accordance with instruction given from the CPU 301 based on the content provision program 1100 retrieved from the HDD 305 to be loaded in the RAM 303.

The content provision server 13 includes a storage unit 1000 configured by the RAM 303 and HDD 305 shown in FIG. 5. A content management DB 1001 and the content provision program 1100 are stored in the storage unit 1000. In the content management DB 1001 (example of content storage device), a content name and a URI for indicating a storage place of the content, etc., associated with a content ID are stored.

The transmission/reception unit 21 is achieved by instructions from the CPU 301 and the network interface 309, etc., shown in FIG. 5, and communicates with the digest management server 18, the user PC 16 and the creator PC 19 through the network N. Specifically, the transmission/reception unit 21 receives a content request with the URI of the content from the user PC 16 or the creator PC 19.

The content provision unit 22 is achieved by instructions from the CPU 301, etc., shown in FIG. 5, and transmits the content identified by the URI to the user PC 16 or the creator PC 19.

The read/write unit 29 is achieved by instructions from the CPU 301, HD 304, etc., shown in FIG. 5, and performs processes for storing data in the storage unit 1000 and for retrieving the data stored in the storage unit 1000.

<User PC 16>

In the following, functions of the user PC 16 will be described. The user PC 16 includes a transmission/reception unit 31, an operational input acceptance unit 32, a web page request unit 33, a web page display unit 34, a digest information request unit 35, a digest reproduction unit 36 and a read/write unit 39. The respective units included in the user PC 16 are functions or means that are achieved by operations performed by any of elements shown in FIG. 5 in accordance with instruction given from the CPU 301 based on the user PC program 2100 retrieved from the HD 304 to be loaded in the RAM 303.

The user PC 16 includes a storage unit 2000 configured by the RAM 303 and HDD 305 shown in FIG. 5. The user PC program 2100 is stored in the storage unit 2000.

The transmission/reception unit 31 is achieved by instructions from the CPU 301 and the network interface 309, etc., shown in FIG. 5, and communicates with the content provision server 13 and the digest management server 18 through the network N. Specifically, the transmission/reception unit 31 receives the content and the digest information.

The operational input acceptance unit 32 is achieved by instructions from the CPU 301, the keyboard 311, the mouse 312, etc., shown in FIG. 5, and accepts operational inputs from the end-user 6. The end-user 6 designates an arbitrary web page or content included in the web page.

The web page request unit 33 is achieved by instructions from the CPU 301, etc., shown in FIG. 5, and requests the web page to the web page server 14 in accordance with the end-user 6's operation. Also, in a case where the end-user 6 gives an instruction for requesting the content indicating the URI thereof, the web page request unit 33 requests the content provision server 13 to provide the content.

The web page display unit 34 is achieved by instructions from the CPU 301, the display 308, etc., shown in FIG. 5, and displays the web page and the content on the display 308.

The digest information request unit 35 is achieved by instructions from the CPU 301, etc., shown in FIG. 5, and acquires the digest information from the digest management server 18 when the digest reproduction of the content is performed by the user PC 16. For example, the digest information request unit 35 acquires in response to the content request (upon the end-user 6 inputting the operations for requesting the content). Or the end-user 6 may input an explicit operation for requesting the digest information.

The digest reproduction unit 36 is achieved by instructions from the CPU 301, the display 308, etc., shown in FIG. 5, and performs the digest reproduction of the content using the digest information. Details of the digest reproduction will be described below.

The read/write unit 39 is achieved by instructions from the CPU 301, HD 304, etc., shown in FIG. 5, and performs processes for storing data in the storage unit 2000 and for retrieving the data stored in the storage unit 2000.

<Digest Management Server>

In the following, functions of the digest management server 18 will be described. The digest management server 18 includes a transmission/reception unit 41, a digest information provision unit 42, a digest information change unit 43 and a read/write unit 49. The respective units included in the digest management server 18 are functions or means that are achieved by operations performed by any of elements shown in FIG. 5 in accordance with instruction given from the CPU 301 based on the digest management program 4100 retrieved from the HD 304 to be loaded in the RAM 303.

The digest management server 18 includes a storage unit 4000 configured by the RAM 303 and HDD 305 shown in FIG. 5. A digest information management DB 4001 and the digest management program 4100 are stored in the storage unit 4000.

TABLE 1

DIGEST INFORMATION TABLE

| CONTENT ID | CONTENT NAME | FRAME ID | POLAR COORDINATES | DISPLAY MAGNIFICATION RATE |
|---|---|---|---|---|
| C001 | 001-A | 5 | (r5, θ5, φ5) | 1 |
| C001 | 001-A | 7 | (r7, θ7, φ7) | 1 |
| C002 | 001-B | 3 | (r3, θ3, φ3) | 3 |
| ... | ... | ... | ... | ... |

In the storage unit 4000, a digest information management DB 4001 (example of position information storage unit) that consists of a digest information table as shown as table 1 is stored. The content name, the frame ID, polar coordinates and a display magnification rate associated with the content ID are recorded in the digest information table. The frame ID is identification information for identifying a frame in the content (video content of spherical image). Detailed descriptions of the frame ID will be given below. A spherical image identified by the frame ID is an example first image. The polar coordinates correspond to the designated point P described above, and are used for defining the eye direction at the capturing points C1-C13. The display magnification rate is applied when reproducing the frame corresponding to the frame ID.

Additionally, in a case where the content creator has not created the digest information, the digest information in an initial state is stored in the digest information management DB 4001. In the digest information in the initial state, the polar coordinates indicate a traveling direction and the display magnification rate is set to be 1.

The transmission/reception unit 41 is achieved by instructions from the CPU 301 and the network interface 309, etc., shown in FIG. 5, and communicates with the user PC 16 and the creator PC 19.

The digest information provision unit 42 is achieved by instructions from the CPU 301, etc., shown in FIG. 5, and transmits the digest information retrieved from the digest information management DB 4001 to the user PC 16 and the creator PC 19 in response to the request.

The digest information change unit 43 is achieved by instructions from the CPU 301, etc., shown in FIG. 5, and registers the digest information in the digest information management table stored in digest information management DB 4001 in response to a request from the creator PC 19.

The read/write unit 49 is achieved by instructions from the CPU 301, HD 304, etc., shown in FIG. 5, and performs processes for storing data in the storage unit 4000 and for retrieving the data stored in the storage unit 4000.

<Creator. PC>

In the following, functions of the creator PC 19 will be described. The creator PC 19 includes a transmission/reception unit 51, an operational input acceptance unit 52, a digest information change display unit 53, a digest information change request unit 54 and a read/write unit 59. The respective units of the creator PC 19 are functions or means that are achieved by operations performed by any of elements shown in FIG. 5 in accordance with instruction given from the CPU 301 based on a digest information program 6100 retrieved from the HD 304 to be loaded in the RAM 303.

The creator PC 19 includes a storage unit 6000 configured by the RAM 303 and HDD 305 shown in FIG. 5. The digest information program 6100 is stored in the storage unit 6000.

The transmission/reception unit 51 is achieved by instructions from the CPU 301 and the network interface 309, etc., shown in FIG. 5, and communicates with the digest management server 18 through the network N.

The operational input acceptance unit 52 is achieved by instructions from the CPU 301, the keyboard 311, the mouse 312, etc., shown in FIG. 5, and accepts operational inputs from the content creator 5. The content creator 5 edits or sets the digest information.

The digest information change display unit 53 is achieved by instructions from the CPU 301, etc., shown in FIG. 5. The digest information change display unit 53 acquires the content from the content provision server 13, and acquires the digest information from the digest management server 18. The digest information change display unit 53 displays a screen, with which the content creator 5 edits the digest information.

The digest information change request unit 54 is achieved by instructions from the CPU 301, etc., shown in FIG. 5, and transmits the digest information edited by the content creator 5 who has input operations in the screen.

The read/write unit 59 is achieved by instructions from the CPU 301, HD 304, etc., shown in FIG. 5, and performs processes for storing data in the storage unit 6000 and for retrieving the data stored in the storage unit 6000.

<Process Flow Up to Digest Information Edit>

Figure 7:
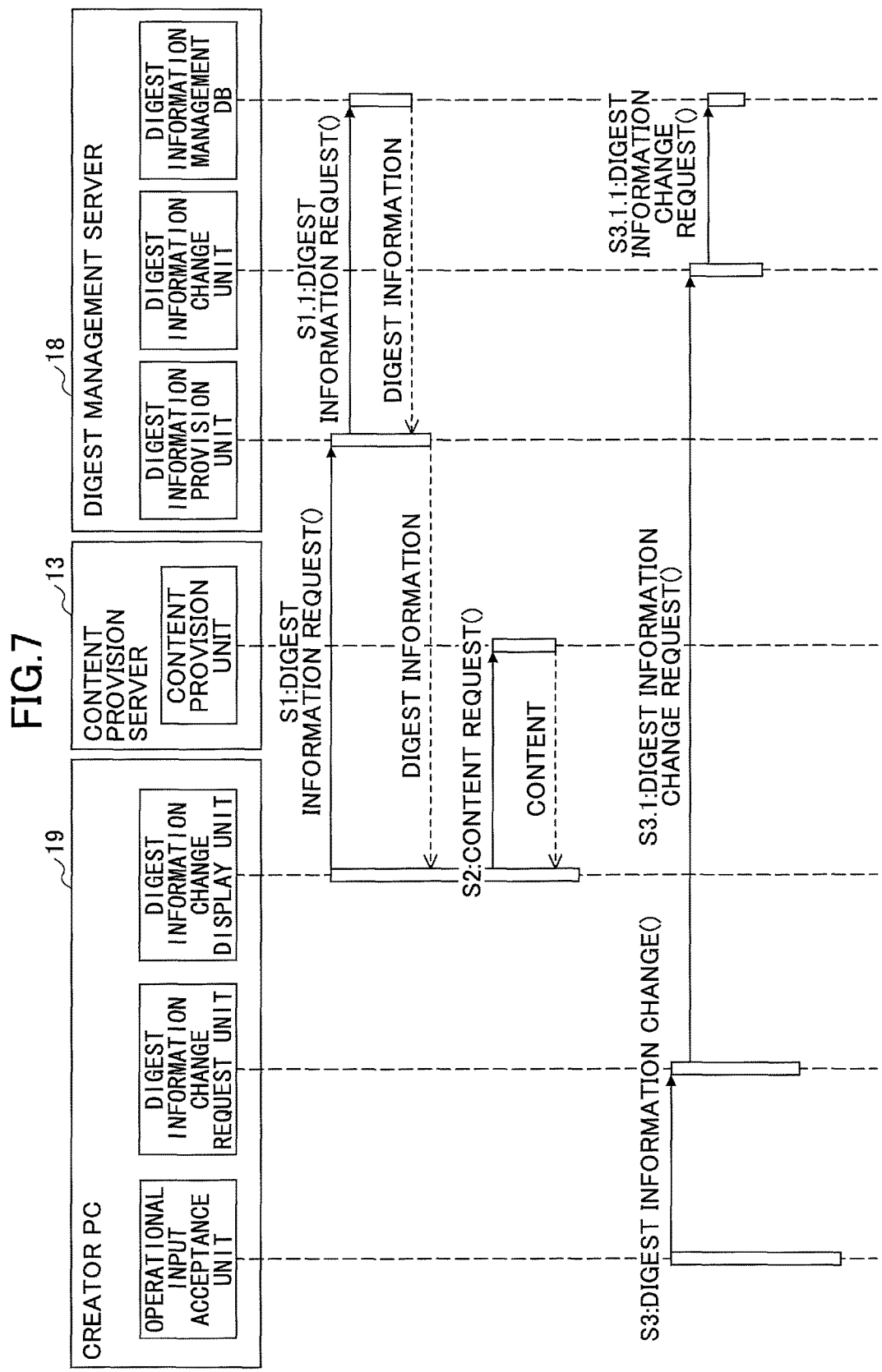
FIG. 7 is a sequence diagram illustrating a process for editing the digest information by the content creator.

FIG. 7 is a sequence diagram illustrating a process for editing the digest information by the content creator 5. In advance of the process shown in FIG. 7, the content has been registered in the content provision server 13, and the digest information in the initial state has been registered in the digest management server 18. Upon the content being given to the content provision server 13, the content provision server 13 transmits the content ID to the digest management server 18. Thus, the digest management server 18 can store the digest information associated with the content ID in the digest information management DB 4001.

In step S1, the digest information change display unit 53 of the creator PC 19 requests the digest management server 18 to provide the digest information in response to the content creator 5's operations. In this case, the content creator 5 recognizes, in advance, the content ID and content name of the content whose digest information is required to be changed because the content creator 5 is a person who treats the same content that has been taken or processed by videographer/photographer 8 and the operator 7 in the content user company. Alternatively, the content creator 5 may log-in the content provision server 13 to display a list of the content, thereby identifying a desired content.

In step S1.1, in response to receiving the digest information request, the digest information provision unit 42 of the digest management server 18 acquires the digest information form the digest information management DB 4001. The digest information provision unit 42 transmits the digest information to the creator PC 19.

In step S2, the digest information change display unit 53 of creator PC 19 requests the content provision server 13 to provide the content associated with the content ID that is associated with the digest information. Thus, the content is acquired from the content provision unit 22.

In step S3, the content creator 5 edits the digest information by inputting operations in a digest information change screen that will be described with reference to FIG. 9. The operational input acceptance unit 52 of the creator PC 19 accepts operational inputs for editing the digest information, and outputs the changed digest information to the digest information change request unit 54.

In step S3.1, the digest information change request unit 54 transmits a digest information change request including the changed digest information to the digest management server 18.

In step S3.1.1, in response to the digest information change request, the digest information change unit 43 of the digest management server 18 changes the digest information table stored in the digest information management DB 4001.

<Edit of Digest Information>

In the following, a process for editing the digest information by the content creator 5 will be described with reference to FIG. 8A-FIG. 11.

Figure 8A:
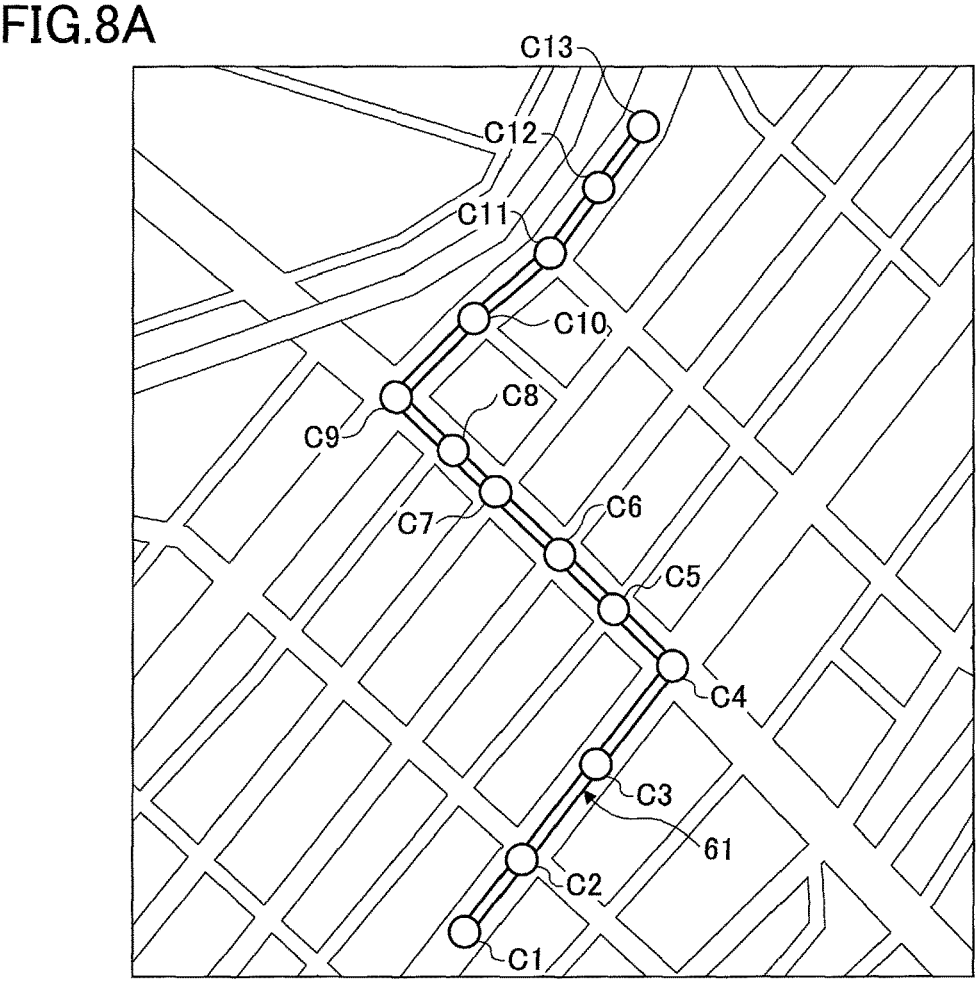
FIG. 8A is a diagram illustrating a route of the content indicated in a map, where the digest information of the content is changed.

FIG. 8A is a diagram illustrating a route 61 of the content indicated in a map, where the digest information of the content is changed. The map shown in FIG. 8A is created by the content creation server 12. The content creation server 12 determines a range of area so as to include all of the capturing points C1-C13 are included in the area, and creates the map by using map data that is acquired through the network N, where the spherical images are captured at respective capturing points.

Also, the content creation server 12 indicates the route 61 on the map. Since the capturing points C1-C13 are known in advance, the route 61 can be found by connecting the capturing points in a sequence of capturing time. The content creation server 12 embeds the spherical images in the capturing points C1-C13 on the route. Here, to embed means to associate the spherical images with the respective capturing points on the map. According to the association, the creator PC 19 can display the spherical images captured at respective capturing points C1-C13 in response to the content creator 5 clicking the capturing points C1-C13 on the map with the mouse, and the like. Additionally, such a map may be created by the content creator 5, etc., instead of the content creation server 12.

For example, an image of the map and the spherical images are designated in HTML data written in HTML and JavaScript, and the HTML data (example of screen information), and the like are transmitted to creator PC 19. A content creator 5's click operation of capturing points C1-C13 with the mouse is detected as an event to display the spherical images captured at the capturing points C1-C13.

Suppose that there is an object (station, public organization, building, shop, sightseeing spot) to which the content creator 5 intends to call the end-user's attention at a designated point P. Also, in this case, the capturing point C4 is the closest capturing point to the designated point P.

Figure 8B:
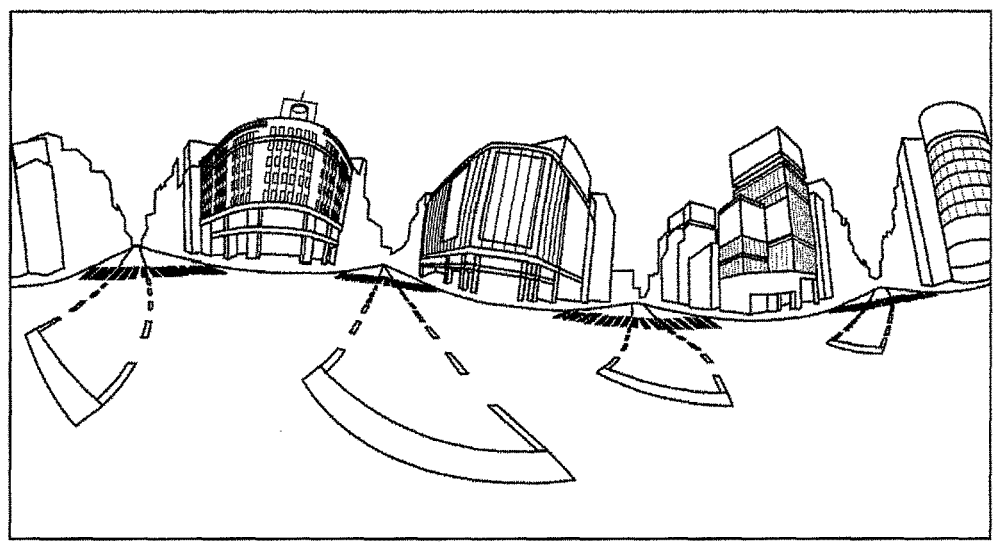
FIG. 8B is a diagram illustrating an example spherical image captured at the capturing point C4.

FIG. 8B is a diagram illustrating an example spherical image captured at the capturing point C4. Spherical images captured at respective capturing points other than the capturing point C4 are also included in the content.

FIG. 9 is a diagram illustrating an example digest information change screen 601 displayed by the creator PC 19. The digest information change screen 601 includes a map section 62 and an image section 63. The map shown in FIG. 8A is displayed in the map section 62. A star-shaped sign indicating the designated point P is shown in the map section 62. The star-shaped sign is shown for convenience of explanation, and it is not displayed in an actual screen.

In the image section 63, a message that "click point to which you want to call end-user's attention" is displayed. In response to the content creator 5 clicking an arbitrary point in the map section with the mouse, etc., the digest information change display unit 53 determines the capturing point C4 as the closest capturing point to display the spherical image captured at the capturing point C4 in the image section 63. In the following, descriptions are given in a case where the content creator 5 clicks the designated point P.

Figure 10:
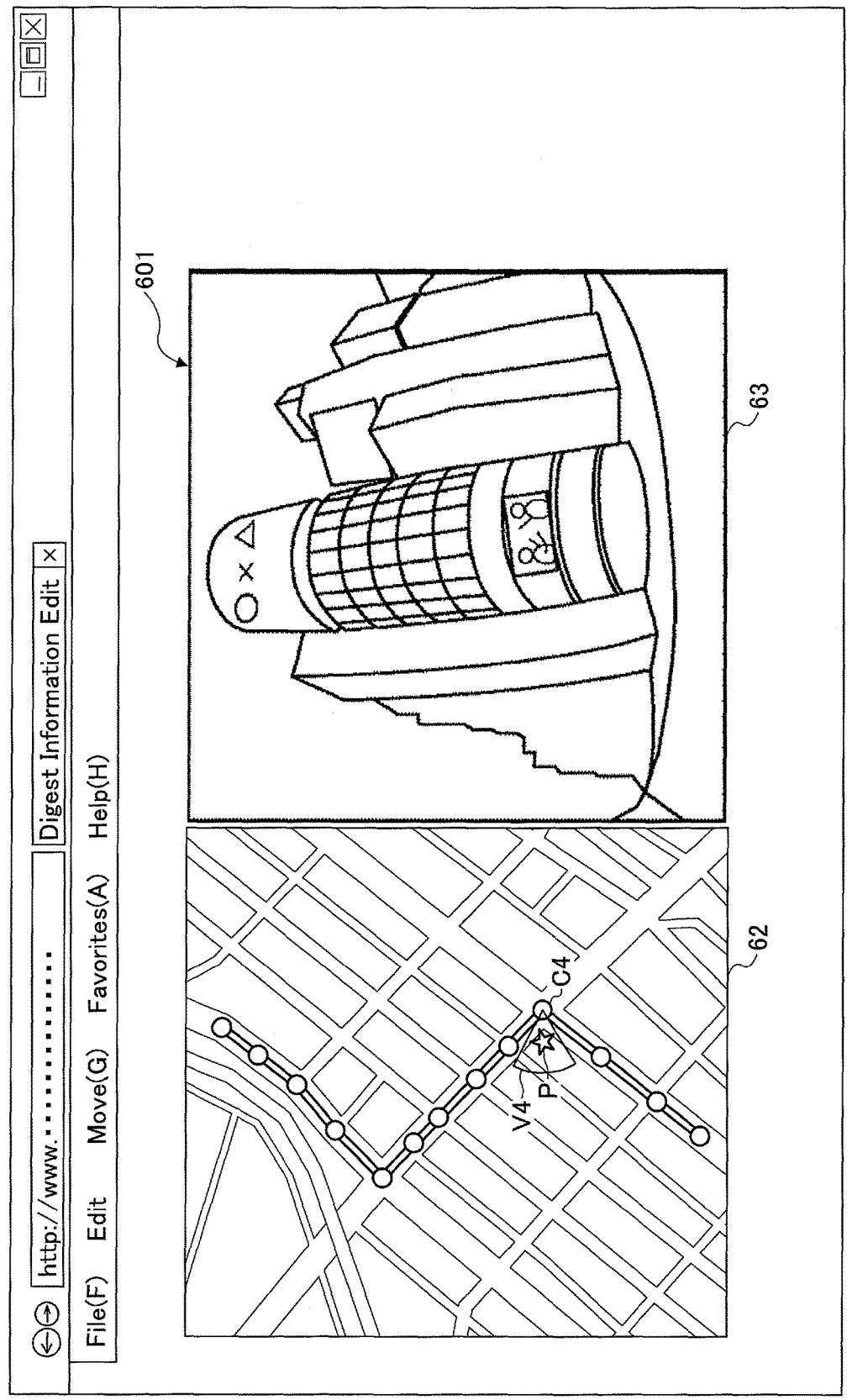
FIG. 10 is a diagram illustrating the digest information change screen displayed when the content creator clicks a designated point.

FIG. 10 is a diagram illustrating the digest information change screen 601 displayed when the content creator 5 clicks the designated point P. In response to the content creator 5 clicking the designated point P, the digest information change display unit 53 determines the capturing point C4 that is the closest capturing point with respect to the designated point P. Further, the digest information change display unit 53 displays the spherical image within display range V4 in the image section 63, where a line connecting the capturing point C4 and the designated point P is set to be an eye direction. In this way, the digest information is edited. A specific method for creating the digest information will be described below.

As described above, the content creator 5 can edit the digest information with a simple operation for selecting a position of the object that is required to call the end-user's attention in the map section 62. Although, only one designated point P is included in the example shown in FIG. 10, the content creator 5 may designate a plurality of the designated points P.

<Digest Information for Magnification/Reduction Display of Spherical Image>

Figure 11:
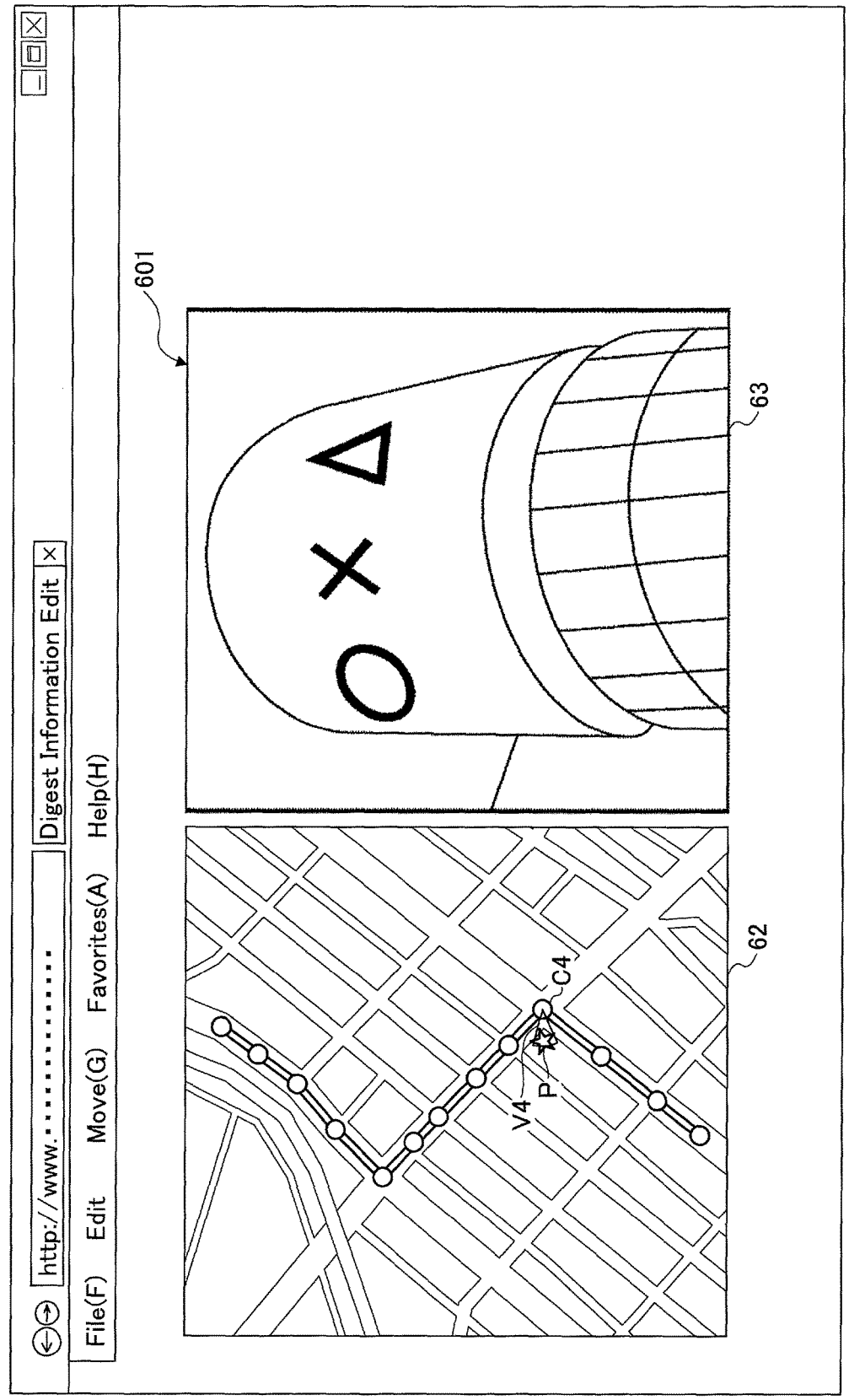
FIG. 11 is a diagram illustrating an example digest information change screen displayed when the content creator inputs an operation of magnification after clicking the designated point.

As shown in FIG. 11, the content creator 5 may have the image of the image section 63 be magnified or reduced. FIG. 11 is a diagram illustrating an example digest information change screen 601 displayed when the content creator 5 inputs an operation of magnification after clicking the designated point P.

For example, the content creator 5 can change the display magnification rate of the display range V4 in the image section 63 after the digest information change screen 601 as shown in FIG. 10 is displayed, where the content creator 5 performs an operation, in which the mouse pointer is positioned in the image section 63 while the wheel of the mouse is rotated. Although, the image is magnified in the example shown in FIG. 11 in comparison to the image shown in FIG. 10, the image may be reduced.

Such an operation is achieved by operational input acceptance unit 52 that detects the wheel rotation while the mouse pointer is positioned in the image section 63 as an event. The operational input acceptance unit 52 determines whether to magnify or to reduce based on a rotational direction, and determines the display magnification rate (magnification rate or reduction rate) in accordance with a rotational amount.

<Digest Reproduction>

Figure 12:
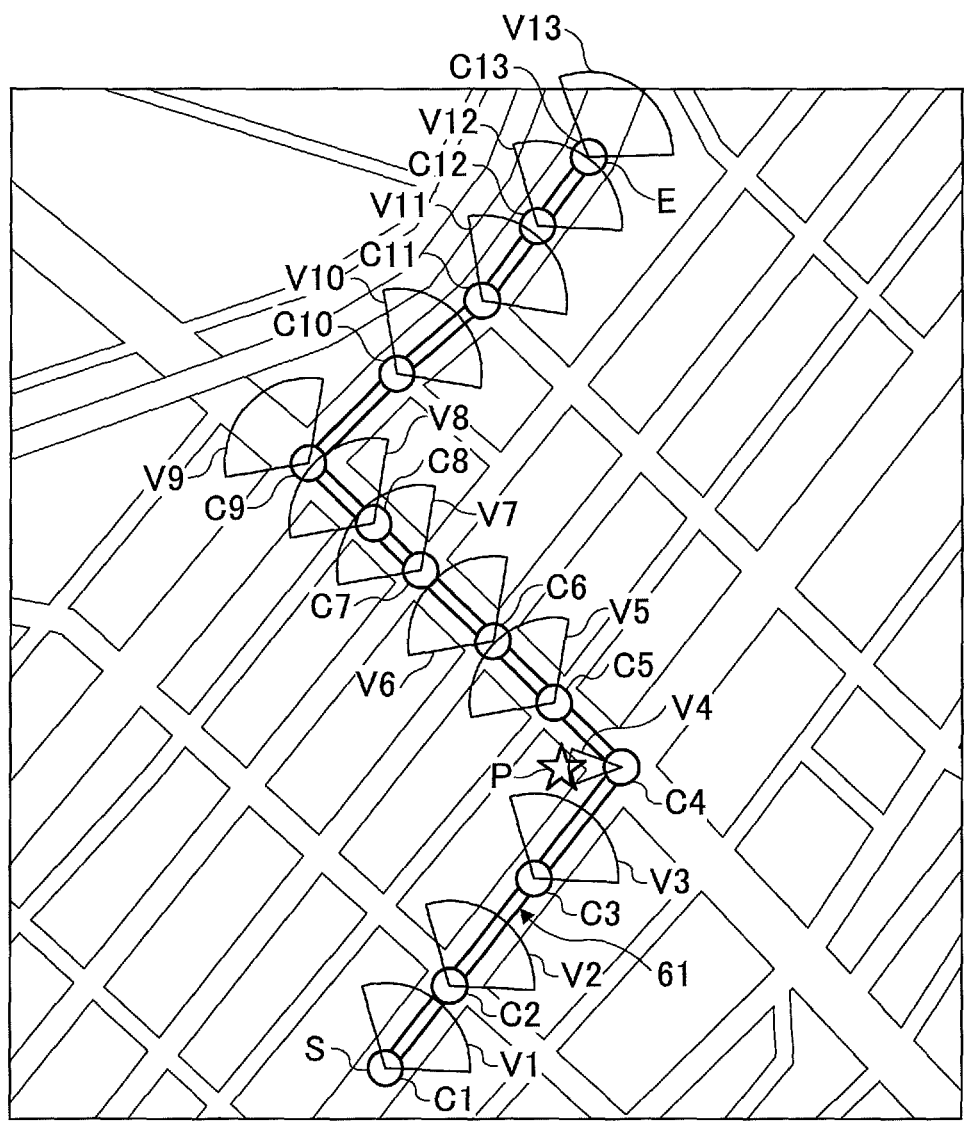
FIG. 12 is a diagram schematically illustrating display ranges that are ranges of images respectively displayed during the digest reproduction.

In the following, the digest reproduction of the content using the digest information edited as described above will be described with reference to FIG. 12. FIG. 12 is a diagram schematically illustrating display ranges V1-V13 that are ranges of images respectively displayed in the display 308 during the digest reproduction. In FIG. 12, the capturing points C1-C13 are indicated on the route 61 by which a travelling path of the videographer/photographer 8 is shown. Also, the display ranges V1-V13 are shown at respective capturing points C1-C13. The display range V4 has been adjusted so that the designated point P is in the eye direction and a desired display magnification rate is applied.

The display ranges V1-V13 respectively indicate which part of the spherical image is displayed by the user PC 16 during the reproduction of the content using the digest information. That is, when the content whose images are captured along the route shown in FIG. 12 is reproduced, the user PC 16 displays the display range V1 of the spherical image in the display 308 corresponding to the capturing point C1. Similarly, the user PC 16 sequentially displays the display ranges V2-V13 of the spherical images in the display 308 corresponding to the capturing points C2-C13.

The display ranges V1-V3 and V5-V13 are set in advance so that the respective display ranges includes a predetermined area of the spherical images and the eye directions are set to be the traveling direction, where the display ranges V1-V3 and V5-V13 corresponds to the capturing points C1-C3 and C5-C13 other than the capturing point C4 that has been selected corresponding to the designated point set by the content creator 5. The traveling direction can be found by following the capturing points associated with the spherical images.

Therefore, when the user PC 16 displays the spherical images captured at the capturing points C1-C3 and C5-C13 other than the capturing point C4 that is the closest capturing point of the designated point P, the display ranges V1-V3 and V5-V13 are set in which the eye direction is set to be the traveling direction. When the user PC 16 displays the spherical images captured at the capturing points C4 that is the closest capturing point of the designated point P, the display ranges V4 is set in which the designated point P is in the eye direction. Therefore, an object that is required to call the end-user's attention is watched by the end-user as the content creator 5 desires.

Additionally, in descriptions with reference to FIG. 9-FIG. 12, the designated point P is set to be in the eye direction only in the spherical image corresponding to the capturing point C4 that is the closest capturing point of the designated point P. However, the designated point P may be also set to be in the eye direction in the spherical image corresponding to another capturing point. For example, two or three capturing points are selected in a sequence close to the designated point P, and the designated point P may be set to be in the eye direction in the spherical images corresponding to the selected capturing points. In this case, the capturing points C3-C5 are selected in FIG. 12. In this way, the content creator 5 can call the end-user's attention to the object for a long time.

<Creation of Digest Information>

Figure 13A:
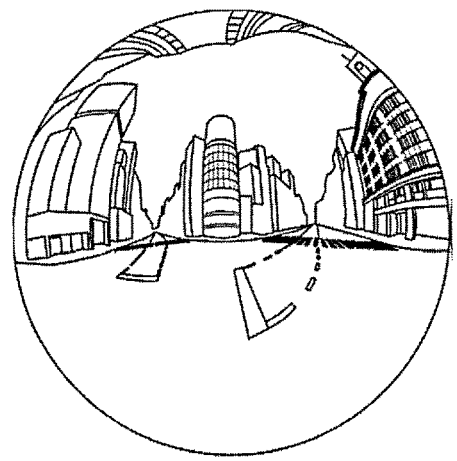
FIG. 13A is a diagram schematically illustrating an example spherical image mapped on a spherical surface.

In the following, creation of the digest information will be described with reference to FIG. 13A-FIG. 14. FIG. 13A, FIG. 13B and FIG. 13C are diagrams illustrating a display method of the spherical image. The spherical image shown in FIG. 8B is converted into a plane image by using Mercator projection. Also, an image converted by using Mercator projection (image of Mercator projection) can be converted into a spherical image. The content provision server 13 transmits the image to the end-user after converting the image of Mercator projection into the spherical image. In a case where the spherical image that has been converted from image of Mercator projection is stored in the content provision server 13, the conversion operation is not required any more.

FIG. 13A is a diagram schematically illustrating an example spherical image mapped on a spherical surface. The spherical image shown in FIG. 13A includes captured objects existing within range of 360° around a capturing point.

Figure 13B:
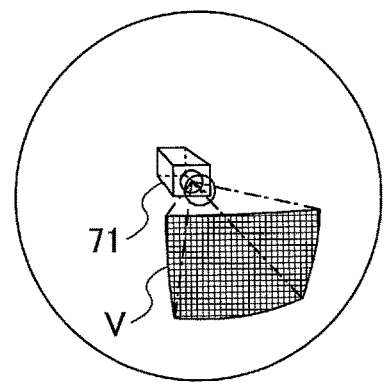
FIG. 13B is a diagram illustrating an example display range V for displaying the spherical image on a display.

FIG. 13B is a diagram illustrating an example display range V for displaying the spherical image on the display 308. A virtual camera 71 is disposed at a center of a spherical body corresponding to the spherical surface on which the spherical image is mapped. In a case where angles are designated in a latitude direction and a longitude direction, a rectangular (not exactly) area can be specified in the spherical body, where the latitude direction and the longitude direction are defined with respect to the eye direction of the virtual camera 71 and the eye direction intersects the rectangular area at the center thereof. The rectangular area corresponds to the display range V.

Figure 13C:
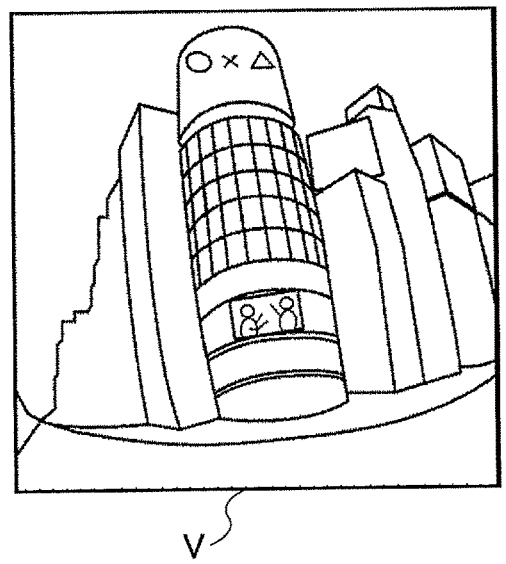
FIG. 13C is a diagram illustrating an image of the display area V included in the rectangular area in a spherical body.

FIG. 13C is a diagram illustrating an image of the display area V displayed in the display 308 within the rectangular area in the spherical body. Therefore, the end-user has the user PC 16 display the image like an image shown in FIG. 13C.

Figure 14:
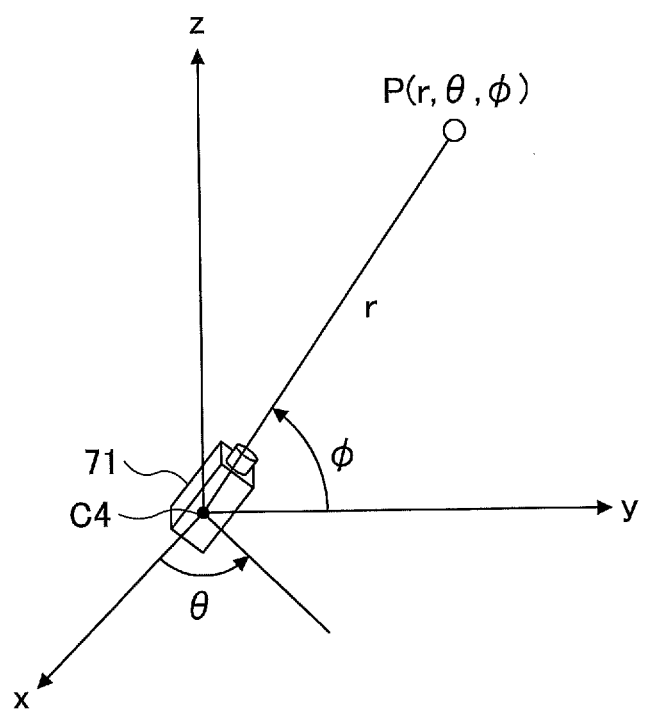
FIG. 14 is a diagram illustrating three-dimensional coordinate system in which the capturing point C4 is set to be its origin.

FIG. 14 is a diagram illustrating three-dimensional coordinate system in which the capturing point C4 is set to be its origin. The virtual camera 71 is disposed at the origin. In a case where the designated point P designated by the content creator 5 is viewed from the virtual camera 71 disposed at the origin, the polar coordinates of the designated point P can be expressed as P (r, θ, φ). Descriptions are given assuming that the capturing point C4 is the origin.

"r" indicates a distance between the capturing point C4 and the designated point P. "θ" indicate an angle in horizontal direction of the virtual camera 71, where a direction of x axis is set to be a reference. "φ" indicates an angle in vertical direction of the virtual camera 71, where the horizontal direction (direction of x axis and y axis) is set to be a reference. Additionally, if a height of the capturing point C4 is the same as the height of the designated point P, "φ" is 0. On the other hand, in a case where a high place such as a mountaintop is designated as the designated point P, the designated point P is higher than the capturing point C4. In this case, "φ" is calculated from a difference of heights and a distance between the capturing point C4 and the designated point P.

As described above, the designated point P can be defined by P (r, θ, φ), and the digest information can be created by defining the frame ID of the spherical image captured at the closest capturing point, the polar coordinates and the display magnification rate.

<Digest Information Corresponding to Other Capturing Points>

In a case where the user PC 16 performs the digest reproduction of the content, preferably, the digest information change display unit 53 creates the digest information corresponding to the capturing points C1-C3 and C5-C13 other than the capturing point C4 that is the closest capturing point of the designated point P. The images captured at capturing points C1-C3 and C5-C13 are examples of second images.

In the initial state, the digest information in which the eye direction (initial eye direction) is set to be the travelling direction is set corresponding to the capturing points C1-C3 and C5-C13 other than the capturing point C4 that is the closest capturing point of the designated point P. However, when such digest information is set, a transition of the capturing point (e.g., from capturing point C3 to C4 or from capturing point C4 to C5) causes a rapid change of the eye direction and the display magnification rate. Therefore, the end-user may feel unnatural during the reproduction.

Hence, digest information change display unit 53 gradually changes the eye direction and the display magnification rate corresponding to the respective capturing points C1-C3 and C5-C13 other than the capturing point C4 that is the closest capturing point of the designated point P. Thus, more natural content of the spherical images can be displayed for the end-user.

Figure 15:
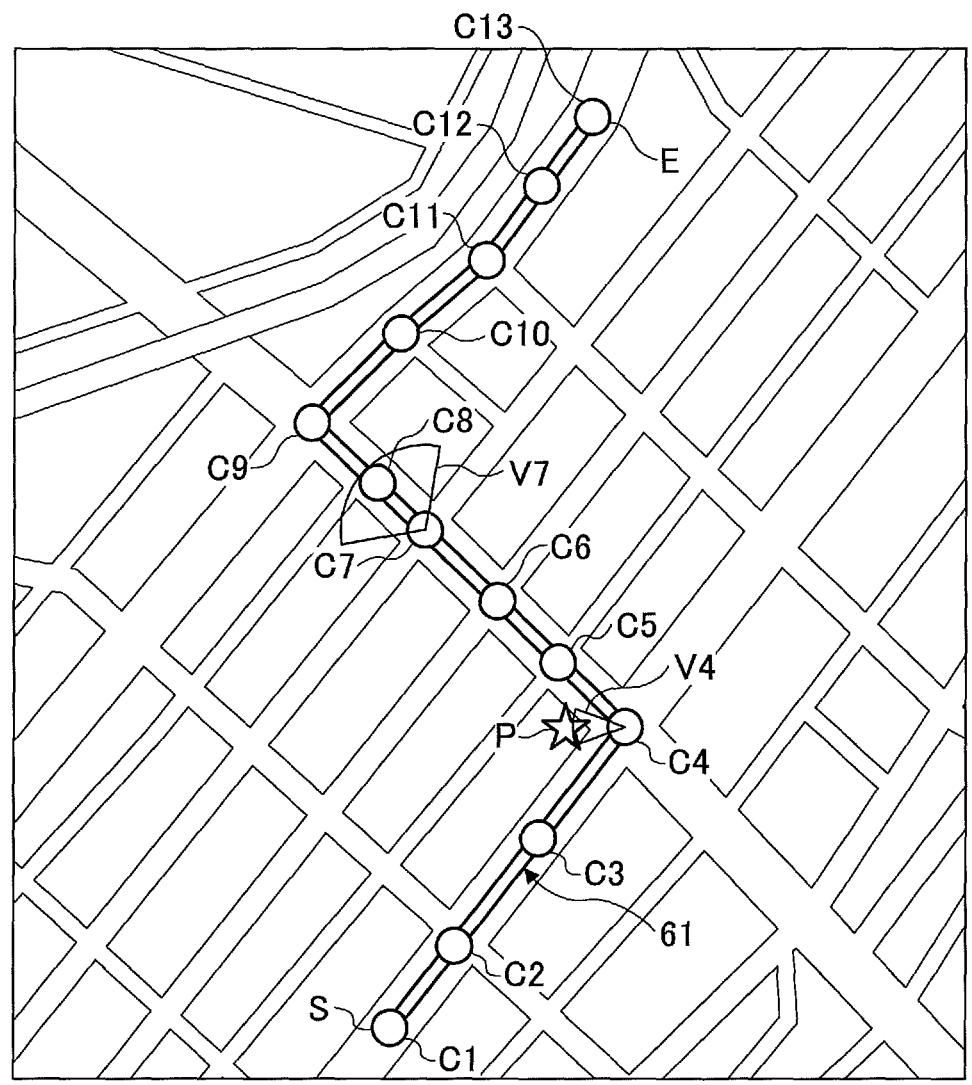
FIG. 15 is a diagram illustrating an example calculation method of the digest information corresponding to a capturing point C7.

FIG. 15 is a diagram illustrating an example calculation method of the digest information corresponding to the capturing point C7. Here, the digest information (eye direction and display magnification rate) corresponding to the capturing point C4 has been calculated. In FIG. 15, the display range V7 is a certain area viewed from the capturing point C7 in which the eye direction is set to be the travelling direction.

In the following, a method for finding the eye direction and the display magnification rate of the capturing point C7 so that the eye direction and the display magnification rate are gradually changed from those of the capturing point C4 will be described. In short, the eye direction and the display magnification rate of the capturing point C4 are reflected to those of the capturing point C7 in accordance with a distance between the capturing points C4 and C7.

Figure 16:
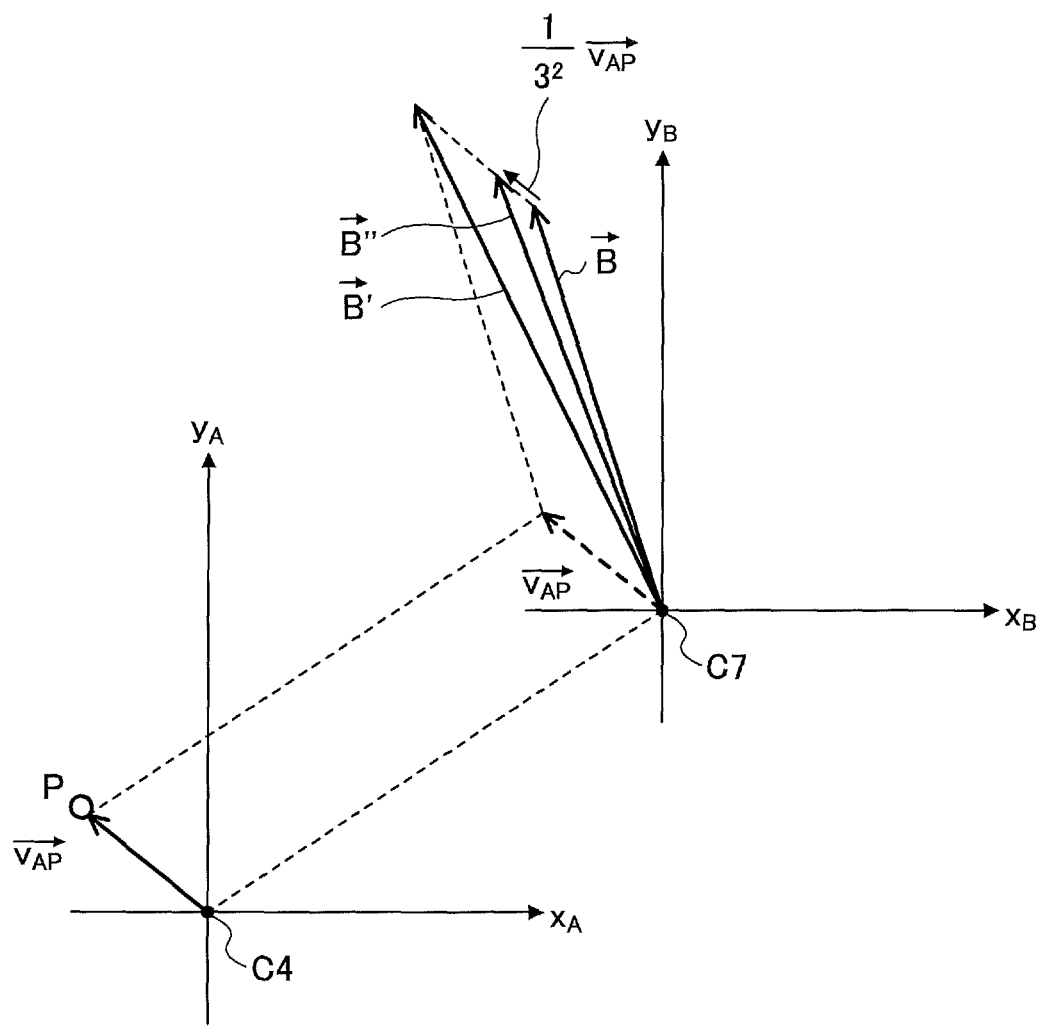
FIG. 16 is a diagram illustrating an example vectors indicating eye directions at the capturing points C4 and C7.

FIG. 16 is a diagram illustrating an example vectors indicating the eye directions at the capturing points C4 and C7. The capturing points C4 and C7 and the designated point P are plotted in a two-dimensional coordinate system. The two-dimensional coordinate system may correspond to a horizontal plane in which a height direction is omitted (elevation angle $\varphi=0$). Therefore, similar descriptions to those in a case of three-dimensional coordinate system can be given. Also, although relative positions of the capturing points C4 and C7 are different from those shown in FIG. 15, calculation results are not affected by the difference.

A vector $v_{AP}$ indicates the eye direction of the capturing point C4. A vector B indicates the traveling direction of the capturing point C7.

A vector B' that is generated by adding the vector $v_{AP}$ to the vector B can be expressed as formula (1), where the vector $v_{AP}$ has been translated as shown in FIG. 16.

[Math. 1]

$$\vec{B'} = \vec{B} + \vec{v_{AP}} \quad (1)$$

However, the vector $v_{AP}$ largely influences the eye direction of the capturing point C7 through such a simple summation of vectors. Therefore, following calculation is performed so that the influence of the vector $v_{AP}$ naturally decays. Here, a method is described, where the method uses "inverse square law" stating that intensity of light is inversely proportional to the square of the distance from the light source.

A vector B" (example eye direction of second image) can be expressed by formula (2), wherein distance between the capturing points C4 and C7 is deemed 3 (capturing points).

[Math. 2]

$$\vec{B''} = \vec{B} + \frac{1}{3^2} \vec{v_{AP}} \quad (2)$$

That is, the eye direction of the capturing point C4 decays by the square of the distance.

Similarly, the display magnification rate can be expressed by formula (3).

"display magnification rate of C7"="display magnification rate of C7"+($\frac{1}{3}^2$)×"display magnification rate of C4" (3)

An actual distance between the capturing points C4 and C7 may be used instead of 3 (capturing points). The eye direction of C7 is set to be the vector B" and the display magnification rate of C7 is set to be the value calculated by formula (3). Additionally, in the calculation, the intensity of the influence of the eye direction of C4 may be influenced inversely proportional to the distance, or inversely proportional to a real multiple of the distance. Moreover, the display magnification rate may be calculated in a manner different from a case of the eye direction.

Similarly, the digest information corresponding to other capturing points C1-C3, C5, C6 and C8-C13 can be calculated. According to the calculation described above, a transition of the capturing point is unlikely to causes a rapid change of the eye direction and the display magnification rate. Therefore, the end-user feels less unnatural during the reproduction.

<Digest Information in a Case of a Plurality of Designated Points>

In the following, the digest information for natural digest reproduction will be described in a case where the content creator 5 designates a plurality of designated points P1 and P2 as points to call end-user's attention.

Figure 17:
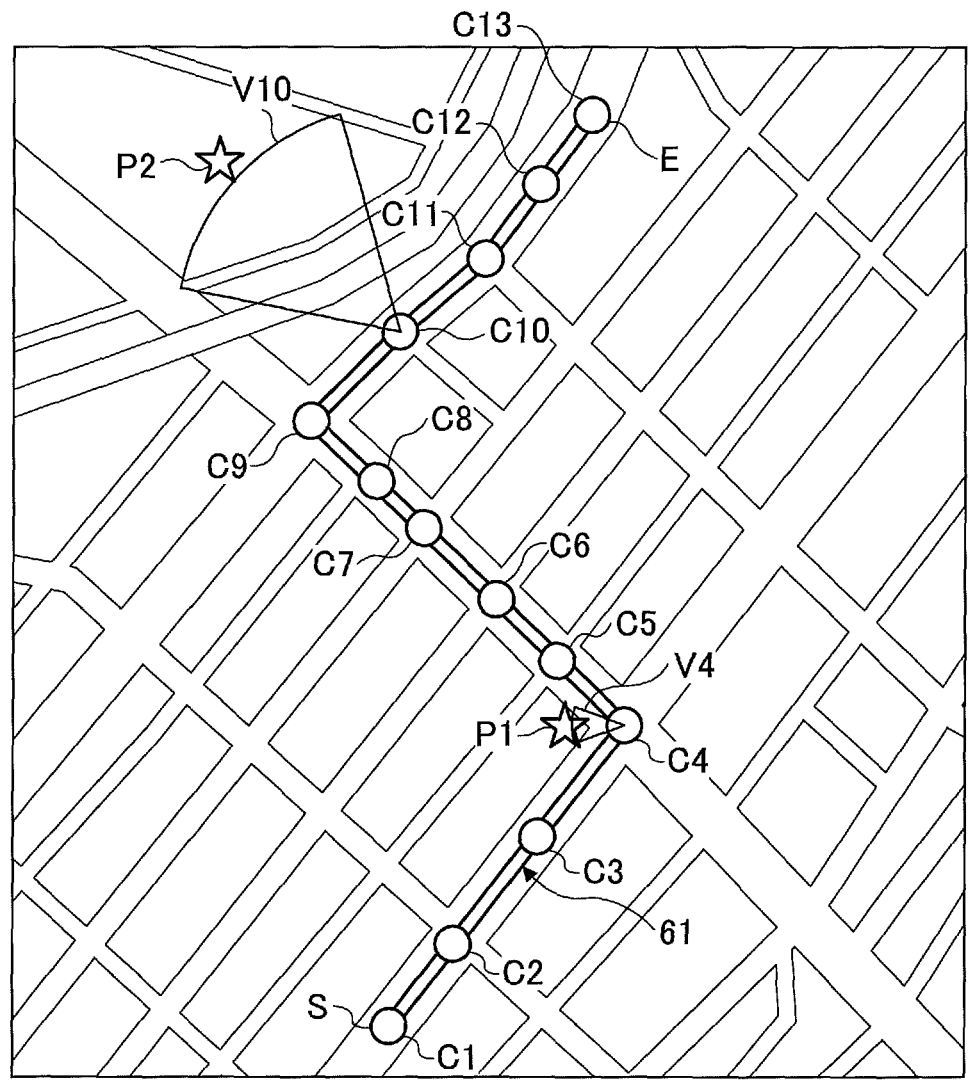
FIG. 17 is a diagram for illustrating an example route on the map where two designated points P1 and P2 are designated.

FIG. 17 is a diagram for illustrating an example route 61 on the map where two designated points P1 and P2 are designated. The closest capturing point of the designated point P1 is the capturing point C4 and the closest capturing point of the designated point P2 is the capturing point C10. The digest information (eye direction and display magnification rate) of capturing points C4 and C10 has been calculated by using the method described with reference to FIG. 10 and FIG. 11.

Figure 18:
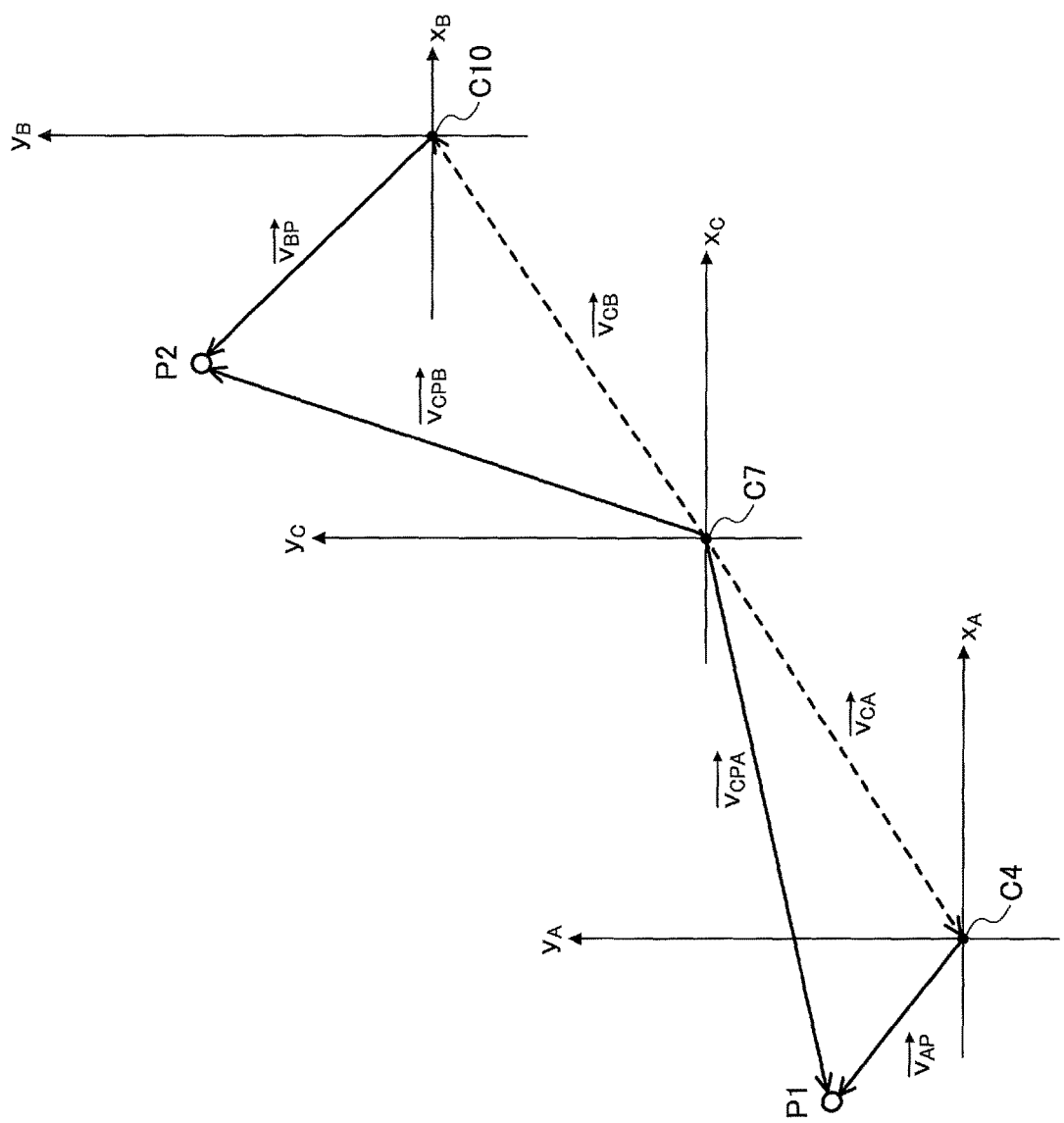
FIG. 18 is a diagram illustrating example vectors indicating the eye directions at capturing points C4, C7 and C10.

In the following, a method for calculating the eye direction and the display magnification rate of the capturing point C7 will be described with reference to FIG. 18. The image captured at the capturing point C7 (C5-C9) that exists between the capturing points C4 and C10 is an example of third image. FIG. 18 is a diagram illustrating example vectors indicating the eye directions at the capturing points C4, C7 and C10. Like in a case of FIG. 16, although the eye directions are plotted in a two-dimensional coordinate system, calculation results are not affected by that. A vector $v_{AP}$ indicating the eye direction of the capturing point C4 toward the designated point P1 and a vector $v_{BP}$ indicating the eye direction of the capturing point C10 toward the designated point P2 have been respectively calculated.

Vectors $v_{CPA}$ and $v_{CPB}$ whose origins are set to be the capturing point C7 are calculated in order to define the eye direction of capturing point C7.

$$v_{CPA} = v_{AP} + v_{CA}$$

The vector $v_{CA}$ can be calculated based on information indicating the latitude and the longitude of the capturing point C4 and C7. Thus, the vector $v_{CPA}$ can be calculated.

Similarly, the vector $v_{CPB}$ can be calculated by using the vector $v_{BP}$.

$$v_{CPB} = v_{BP} + v_{CB}$$

Figure 19:
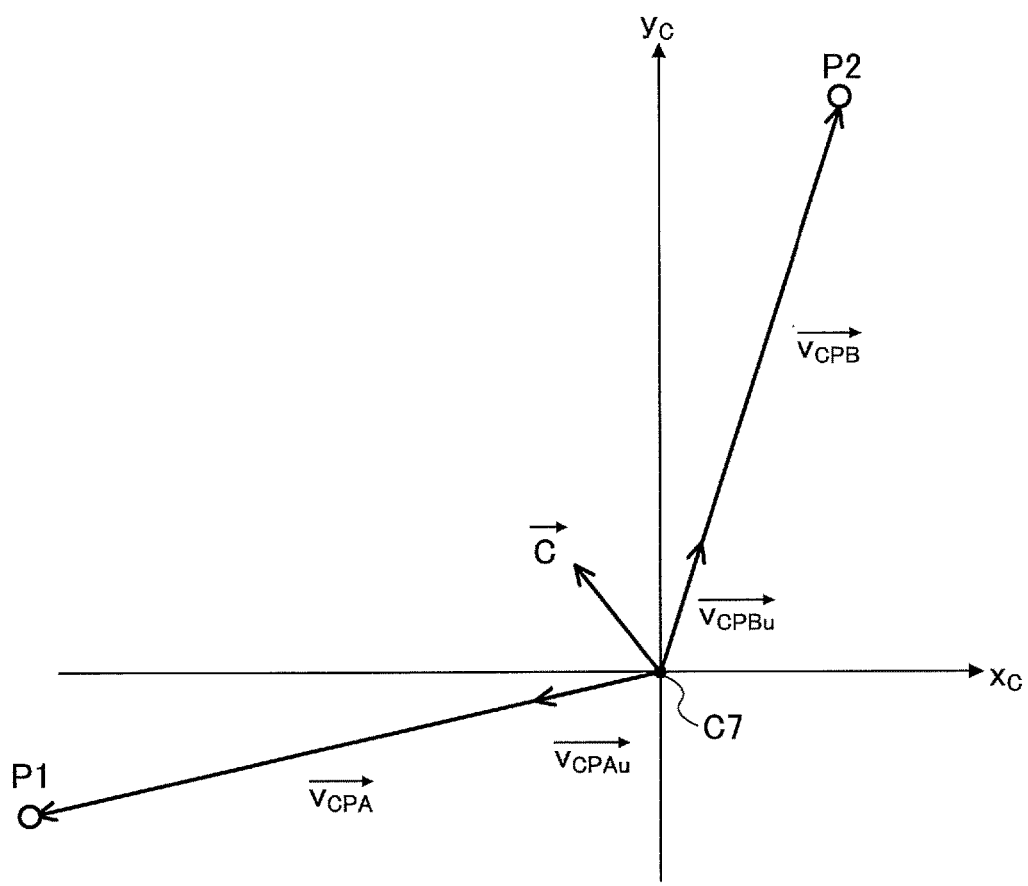
FIG. 19 is a diagram illustrating vectors where unnecessary vectors having been used in FIG. 18.

In the following, calculation method of vector information of eye direction vector of the capturing point C7 will be described with reference to FIG. 19. FIG. 19 is a diagram illustrating vectors where unnecessary vectors having been used in FIG. 18 are omitted. Vectors $v_{CPAu}$ and $v_{CPBu}$ are unit vectors of respective vectors $v_{CPA}$ and $v_{CPB}$. A vector C calculated by formula (4) is set to be the eye direction of the capturing point C7.

$$\text{Vector } C = v_{CPAu} + v_{CPBu} \qquad (4)$$

As described above, the eye direction vector of the capturing point C7 can be defined by adding vectors indicating respective directions for viewing the designated points P1 and P2 from the capturing point C7.

Figure 20:
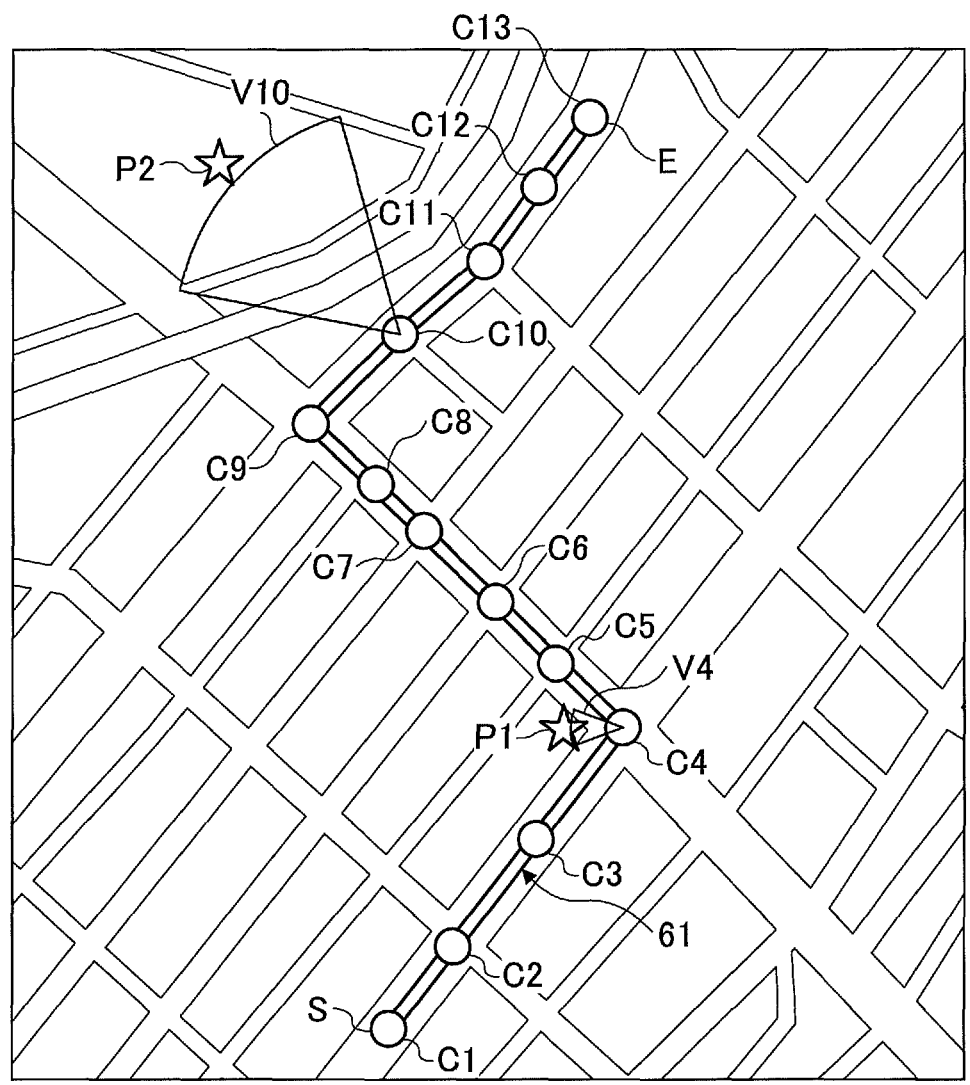
FIG. 20 is a diagram for illustrating an example calculation method of display magnification rate of the capturing point C7.

In the following, the display magnification rate of the capturing point C7 will be described with reference to FIG. 20. FIG. 20 is a diagram for illustrating an example calculation method of the display magnification rate of the capturing point C7. As shown in FIG. 20, the capturing point C4 is the fourth capturing point, the capturing point C7 is the seventh capturing point, and the capturing point C10 is the tenth capturing point from the start point S on the route 61.

The display magnification rate of the capturing point C7 is calculated to be a value between the display magnification rates of capturing points C4 and C10 so that a smooth digest reproduction can be performed. The display magnification rate of the capturing point C4 is r4, and the display magnification rate of the capturing point C10 is r10. The display magnification rate r7 of the capturing point C7 can be calculated by formula (5).

$$r7 = r4 + (r10 - r4)\{(7-4)/(10-4)\} \qquad (5)$$

That is, a difference of the display magnification rates between the capturing points C4 and C10 is multiplied by a ratio of a distance between the capturing points C7 and C4 to a distance between the capturing points C4 and C10, and the multiplied value is added to the display magnification rate of the capturing point C4. The value calculated by formula (5) is set to be the display magnification rate of the capturing point C7. When the display magnification rate of the capturing point C7 is set in this way, a smooth change of the display magnification rate can be achieved during the digest reproduction.

The digest information of capturing points C5, C6, C8 and C9 can be calculated similarly to a case of FIG. 19 and FIG. 20. The digest information of capturing points C1-C3 can be calculated through the calculation described with reference to FIG. 15 and FIG. 16 because digest information of capturing points C1-C3 are only affected by the designated point P1. Also, the digest information of capturing points C11-C13 can be calculated through the calculation described with reference to FIG. 15 and FIG. 16 because digest information of capturing points C11-C13 are only affected by the designated point P2.

Figure 21:
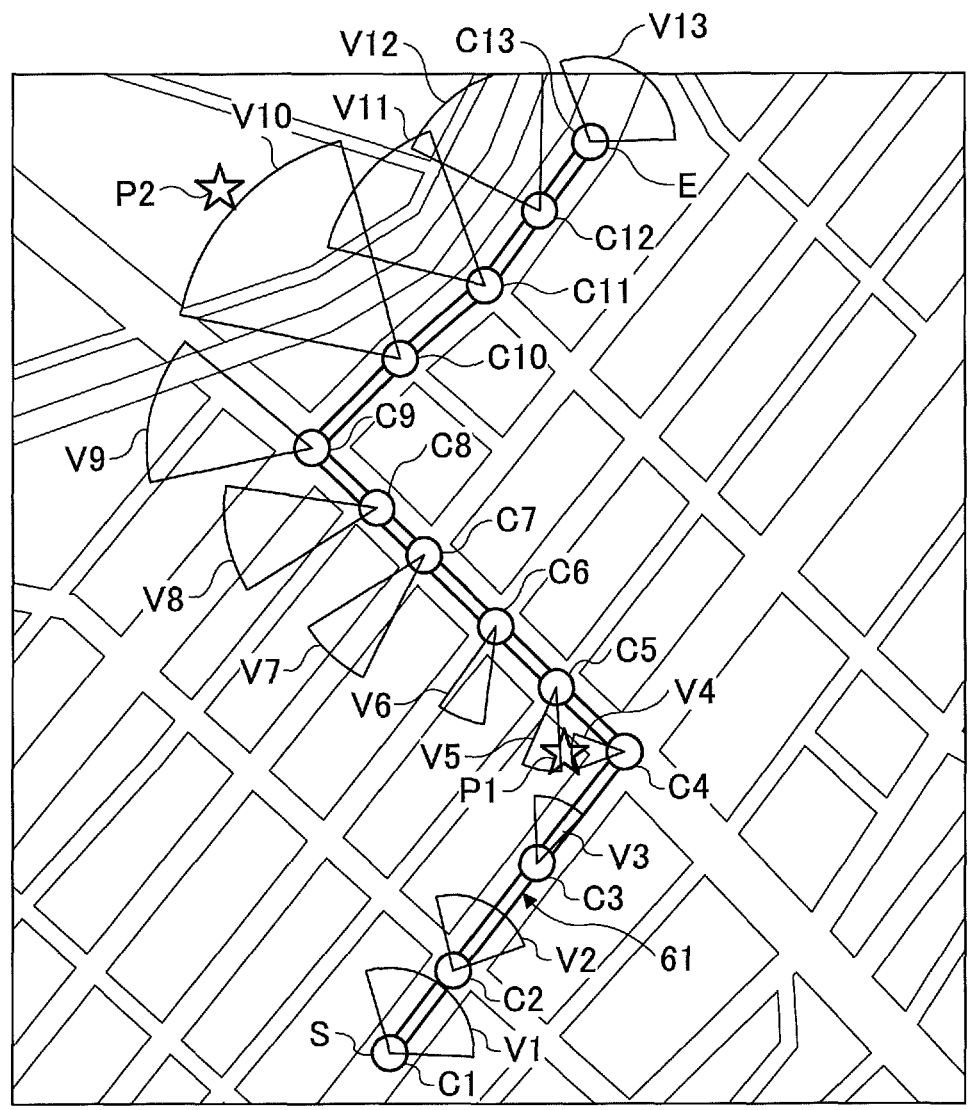
FIG. 21 is a diagram schematically illustrating the display ranges of the images displayed during the digest reproduction.

FIG. 21 is a diagram schematically illustrating the display ranges V1-V13 of the images displayed in the display 308 during the digest reproduction. Mainly, differences from FIG. 12 will be described with reference to FIG. 21.

The display ranges V1-V13 indicate which parts of the spherical images are displayed in the display 308 when the content is reproduced by the user PC 16 in accordance with the digest information. Also, sizes of the display ranges V1-V13 are related to the display magnification rate.

As described in FIG. 21, according to the display ranges V1-V13, the eye direction is gradually directed to the designated point P1 through the capturing points C1-C3. The eye direction is exactly directed to the designated point P1 at the capturing point C4, then, the eye direction is gradually directed to the designated point P2 through the capturing points C5-C9. The eye direction is exactly directed to the designated point P2 at the capturing point C10, then, the eye direction gradually coincides with the travelling direction through the capturing points C11-C13. Thus, the eye direction is smoothly changed.

Also, the display magnification rate is enlarged (display range narrows) at the capturing point C4 and reduced (display range widens) at the capturing point C10. The display range gradually narrows as the display ranges V1-V3 because the display magnification rate gradually changes into the display magnification rate of the capturing point C4 through the capturing points C1-C3. The display magnification rate becomes the value set by the content creator 5 at the capturing point C4, then, the display magnification rate is set based on the distance between the capturing points C4 and C10 at the capturing points C5-C9. Therefore, the display ranges gradually widen as the display ranges V5-V9. The display magnification rate becomes the value set by the content creator 5 at the capturing point C10, then, the display magnification rate increases based on the distance from the capturing points C10 at the capturing points C11-C13. Therefore, the display range gradually narrows as the display ranges V11-V13. Thus, the display magnification rate is smoothly changed.

<Operation Process of Digest Reproduction>

In the flowing, an operation process of the digest reproduction using the digest information created as described above will be described.

Figure 22:
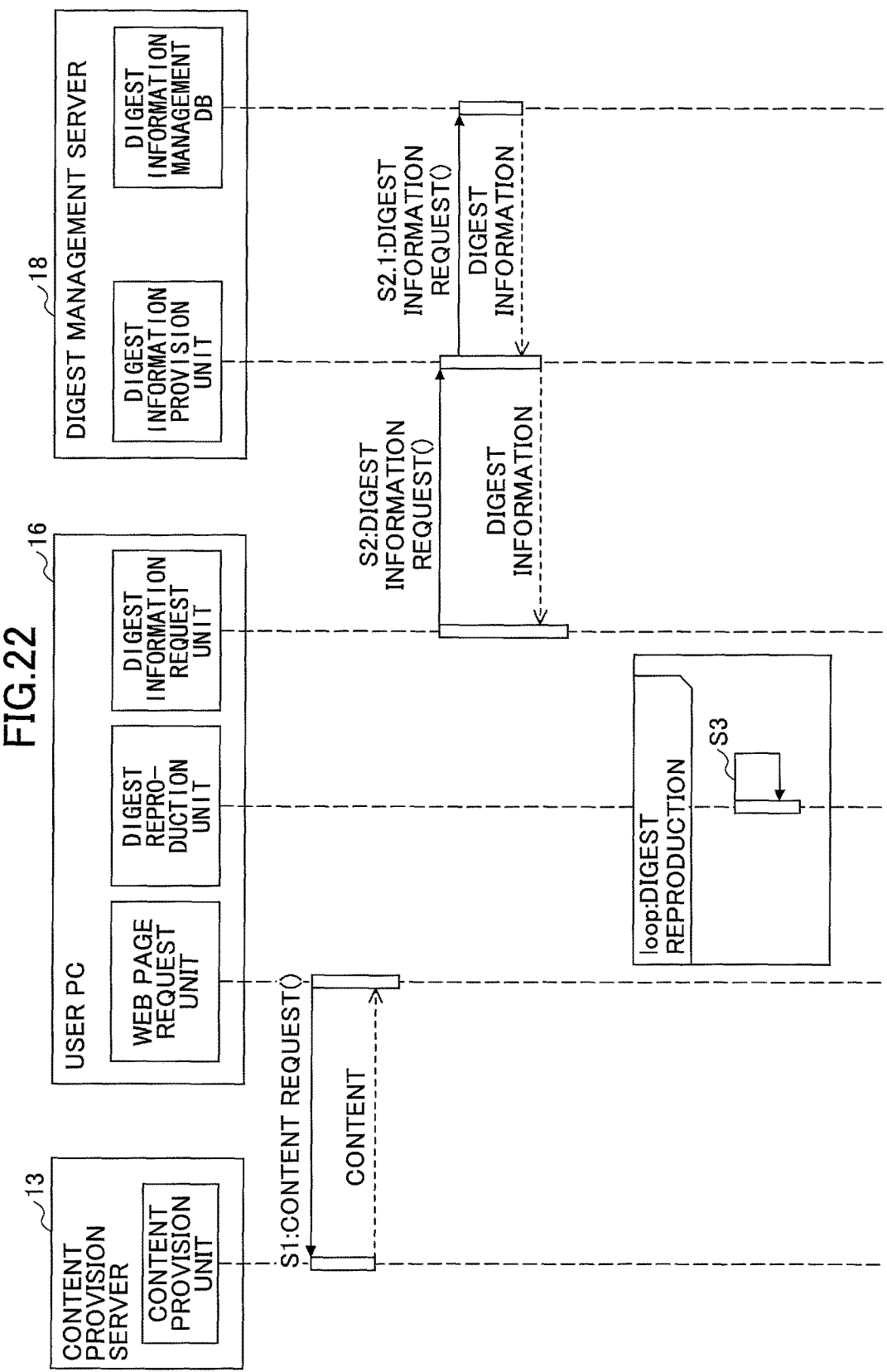
FIG. 22 is a sequence diagram illustrating an example process of a digest reproduction performed in the content provision system.

FIG. 22 is a sequence diagram illustrating an example process of the digest reproduction performed in the content provision system 100. The process shown in FIG. 22 is started in response to the end-user giving an instruction to perform the digest reproduction of the content.

In step S1, the web page request unit 33 of the user PC 16 requests the content provision server 13 to provide the content in response to the operational input from the end-user. Accordingly, the web page request unit 33 acquires the content. At this time, information for identifying the content such as the content ID is also acquired. Additionally, a process for requesting the web page to the web page server 14 is omitted. Also, the content may be acquired without requesting the web page.

In step S2, the digest information request unit 35 of the user PC 16 requests the digest management server 18 to provide the digest information of the content designating the content ID, and the like. The request of the digest information may be transmitted in response to an operational input from the end-user for requesting the digest information, or may be automatically transmitted in response to receiving the content.

In step S2.1, the digest information provision unit 42 of the digest management server 18 retrieves the digest information associated with the content ID, etc., from the digest information management DB 4001. The digest information provision unit 42 transmits the digest information to the user PC 16.

In step S3, the digest reproduction unit 36 of the user PC 16 performs the digest reproduction of the content acquired in step S1 using the digest information acquired in step S2.

Figure 23:
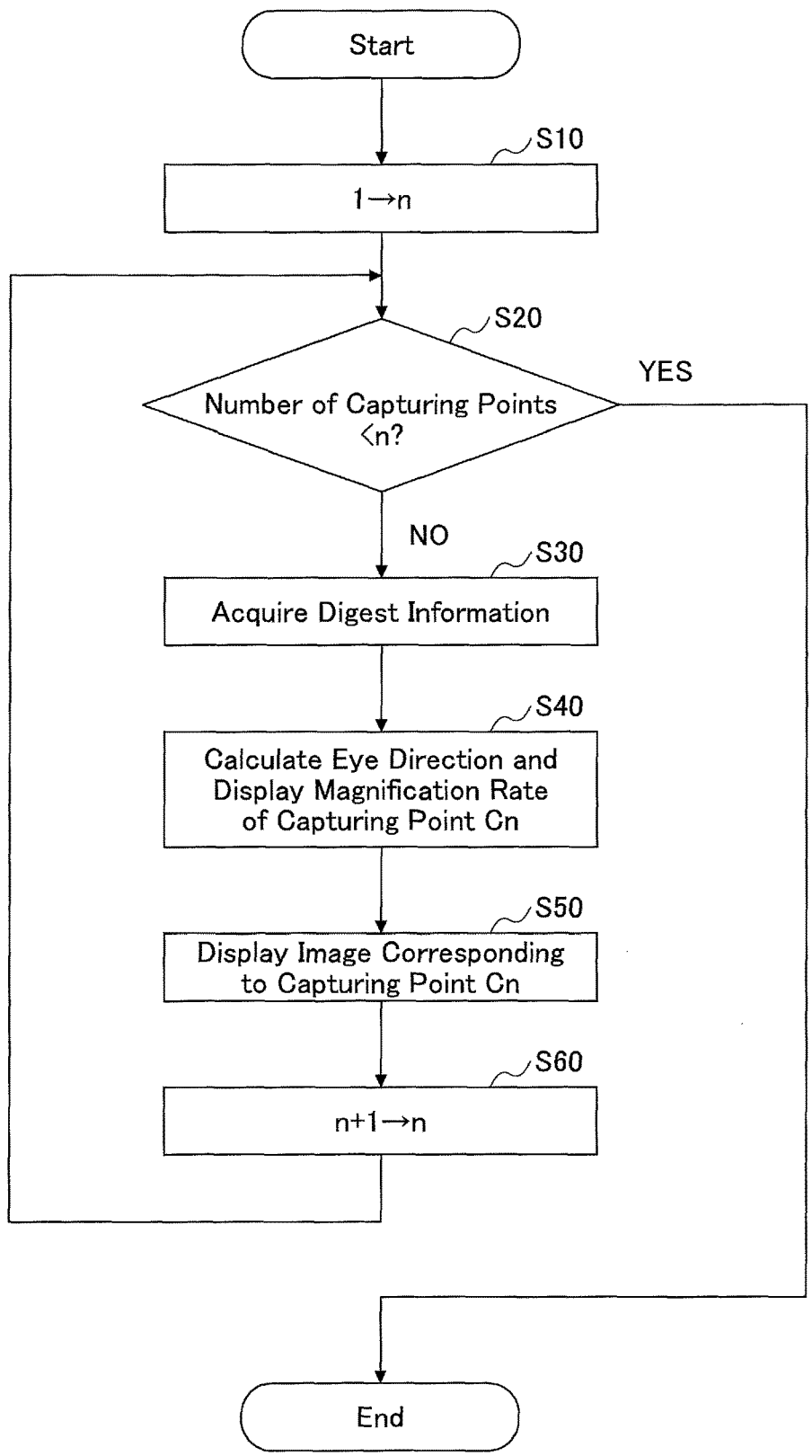
FIG. 23 is a flowchart illustrating an example process of digest reproduction performed in step S3.

FIG. 23 is a flowchart illustrating an example process of digest reproduction performed in step S3 of FIG. 22. The process shown in FIG. 23 starts in response to receiving the content and the digest information or in response to the operational input of the end-user.

The digest reproduction unit 36 sets 1 in a variable "n" (step S10). The variable n is provided for managing the capturing points C1-C13.

The digest reproduction unit 36 determines whether a suffix number of a given capturing point is less than variable n. In this case, numbers of 1-13 are respectively compared with the variable n (step S20). In a case where all of the numbers of 1-13 are determined to be less than variable n (YES in step S20), the process is terminated because no spherical image is to be processed.

In a case where any of the numbers of 1-13 are determined not to be less than variable n (NO in step S20), the digest reproduction unit 36 retrieves the digest information corresponding to "n"th capturing point Cn (step S30).

The digest reproduction unit 36 calculates the eye direction and the display magnification rate of the spherical image corresponding to the capturing point Cn based on the digest information (step S40). For example, in a case where the closest capturing point of the designated point P exists only in forward direction, the eye direction is calculated by formula (2) and the display magnification rate is calculated by formula (3). Also, in a case where the closest capturing point of the designated point P exists only in backward direction, the calculations are performed similarly. In a case where the closest capturing points of the designated point P exists both in forward direction and backward direction, the eye direction is calculated by formula (4) and the display magnification rate is calculated by formula (5).

The digest reproduction unit 36 displays the spherical image corresponding to the capturing point Cn using the calculated eye direction and the display magnification rate (step S50).

The digest reproduction unit 36 increments the variable n by 1 (step S60). Processes from step S20 are repeatedly performed.

As described above, the digest reproduction of the content of the spherical image is performed with varying the eye direction and the display magnification rate.

<Reproduction Speed>

It is also an efficient way to change a reproduction speed corresponding to the respective capturing points C1-C13. For example, a slow reproduction is performed in the vicinity of the closest capturing point of the designated point while a quick reproduction is performed at other capturing points.

Figure 24:
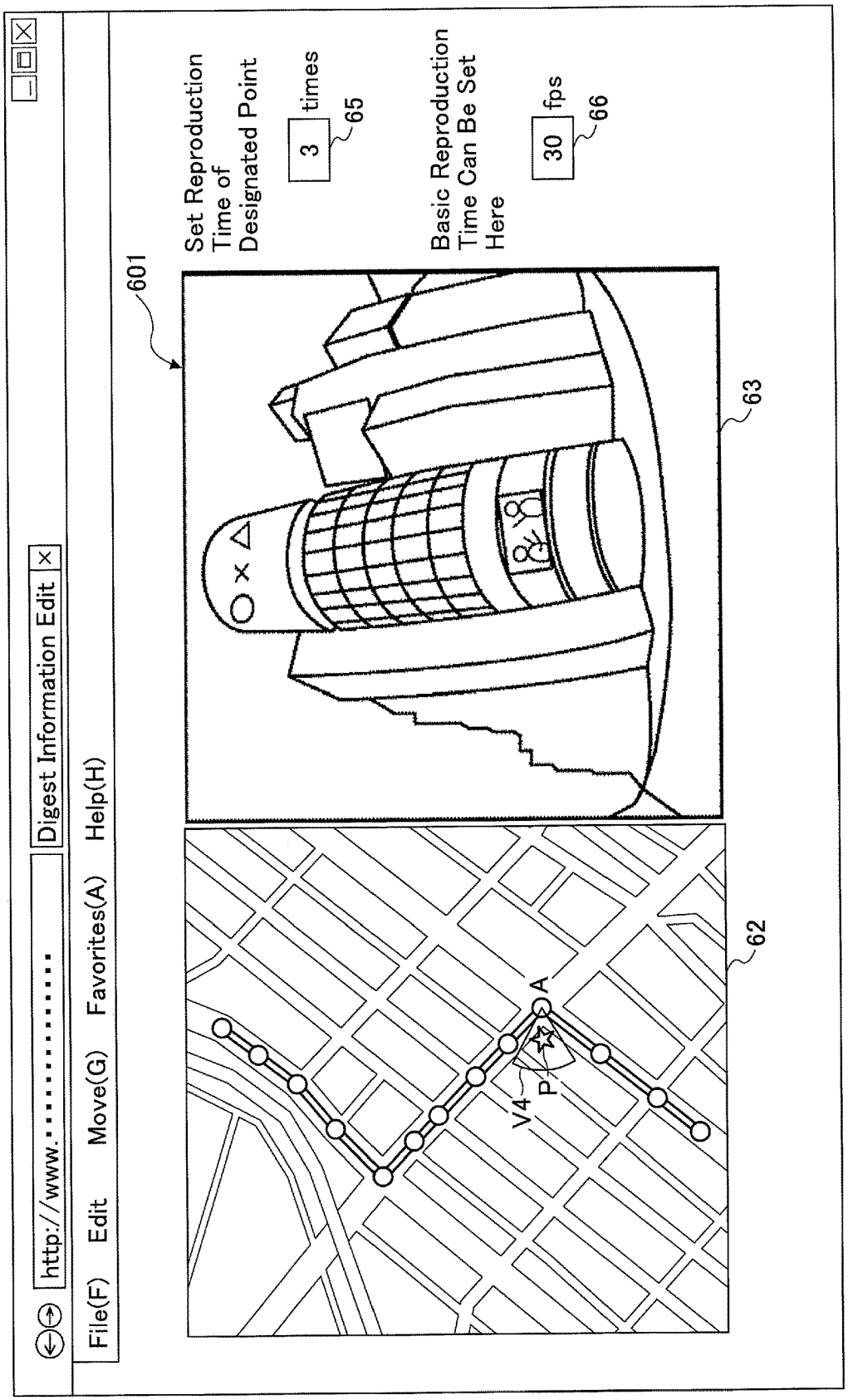
FIG. 24 is a diagram illustrating an example digest information change screen with which a reproduction time can be set.

FIG. 24 is a diagram illustrating an example digest information change screen 601 with which a reproduction time (reproduction speed) can be set. In FIG. 24, the map section 62, the image section 63, a reproduction time setting field 65 and a basic reproduction time setting field 66 are shown.

The content creator 5 can set an arbitrary value in the reproduction time setting field 65 as the reproduction time (reproduction speed). The reproduction time of the reproduction time setting field 65 is indicated by a value by which the reproduction time of the capturing points other than the capturing point C4 that is the closest capturing point of the designated point P is multiplied.

The reproduction time of the capturing points other than the capturing point C4 is referred to a basic reproduction time. The content creator 5 can set an arbitrary value in the reproduction time setting field 66 as the basic reproduction time (reproduction speed). Therefore, the content creator 5 can shorten the reproduction time of the capturing points other than the capturing point C closest to the designated point, or lengthen the reproduction time of the capturing point C closest to the designated point P.

Additionally, similarly to a case of the display magnification rate, the reproduction time of the capturing points other than the capturing point C4 is adjusted in accordance with the distance from the capturing point C4. Therefore, the reproduction speed can be also smoothly changed.

As described above, in the content provision system 100 of the present embodiment, the designated point P calls the end-users attention as the content creator 5 desired, where wide range images that cannot be entirely displayed at once, such as the spherical images, are displayed.

Second Embodiment

In the present embodiment, the content provision system 100 which can automatically create the digest information without the content creator 5 setting the digest information will be described. Usually, the designated points P designated by the content creator 5 are locations having popular features. Such a features (including station, public organization, building, shop, sightseeing spot, etc.) are registered in the map data. Therefore, the content provision system 100 can create the digest information referring to the map data.

Figure 25:
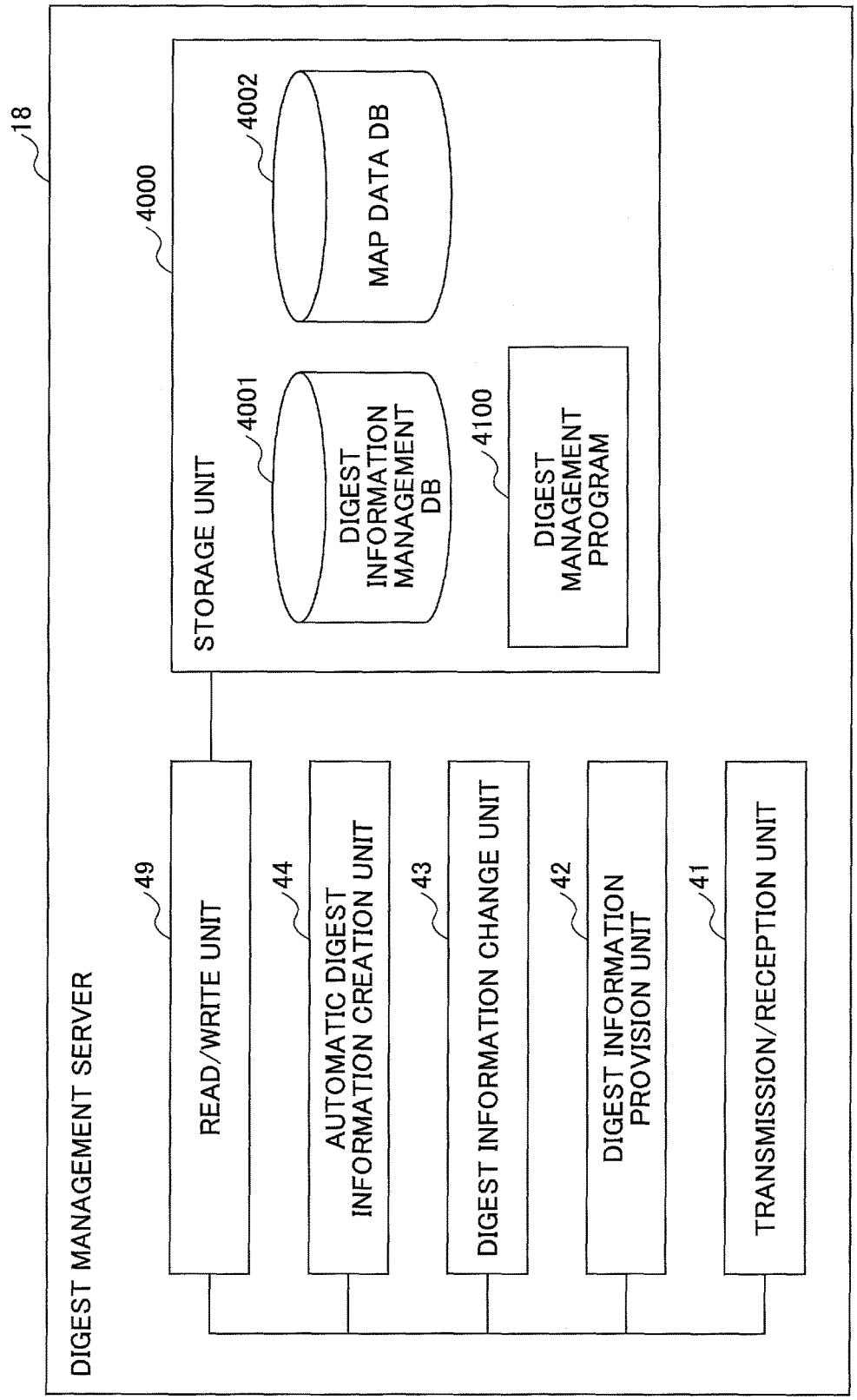
FIG. 25 is a block diagram illustrating an example functional configuration of the digest management server of a second embodiment.

FIG. 25 is a block diagram illustrating an example functional configuration of the digest management server 18 of the present embodiment. The content provision server 13, the user PC 16 and the creator PC 19 may be the same as those in the first embodiment. The digest management server 18 shown in FIG. 25 includes an automatic digest information creation unit 44 and a map data DB 4002 (map data storage device).

The map data DB 4002 stores information items of main features associated with position information (longitude, latitude and height). The map data DB 4002 may not be included in the content provision system 100, and the content provision system 100 may use Web API (Web Application Programming Interface) opened to public. The Web API is a protocol (method for requesting process, for designating data, etc.) for performing processes between two apparatuses through a network. "GOOGLE PLACES API", "Itsumo NAVI API", API provided by Yahoo, etc., are known as the Web API of the map data DB 4002.

The automatic digest information creation unit 44 is achieved by instructions form the CPU 301 shown in FIG. 5, etc., and automatically creates the digest information using the map data DB 4002. Specifically, peripheral information items of the capturing points C1-C13 of the content are acquired form the map data DB 4002. Information items indicating features within a predetermined distance from the respective capturing points C1-C13 are acquired from the map data DB 4002. The features correspond to the designated points P. In a case where multiple features exist, features are may be selected based on a predetermined attribute (station, public organization, building, sightseeing spot, etc.) of the feature. Also, the features may be searched for in the internet, and only features registered in the DNS server (that is, having URL) may be selected. The automatic digest information creation unit 44 creates the digest information setting the position information of the features corresponding to the acquired information items to be the designated points P. Methods for calculating the eye direction and the display magnification rate, etc., are similar to those in the first embodiment.

Figure 26:
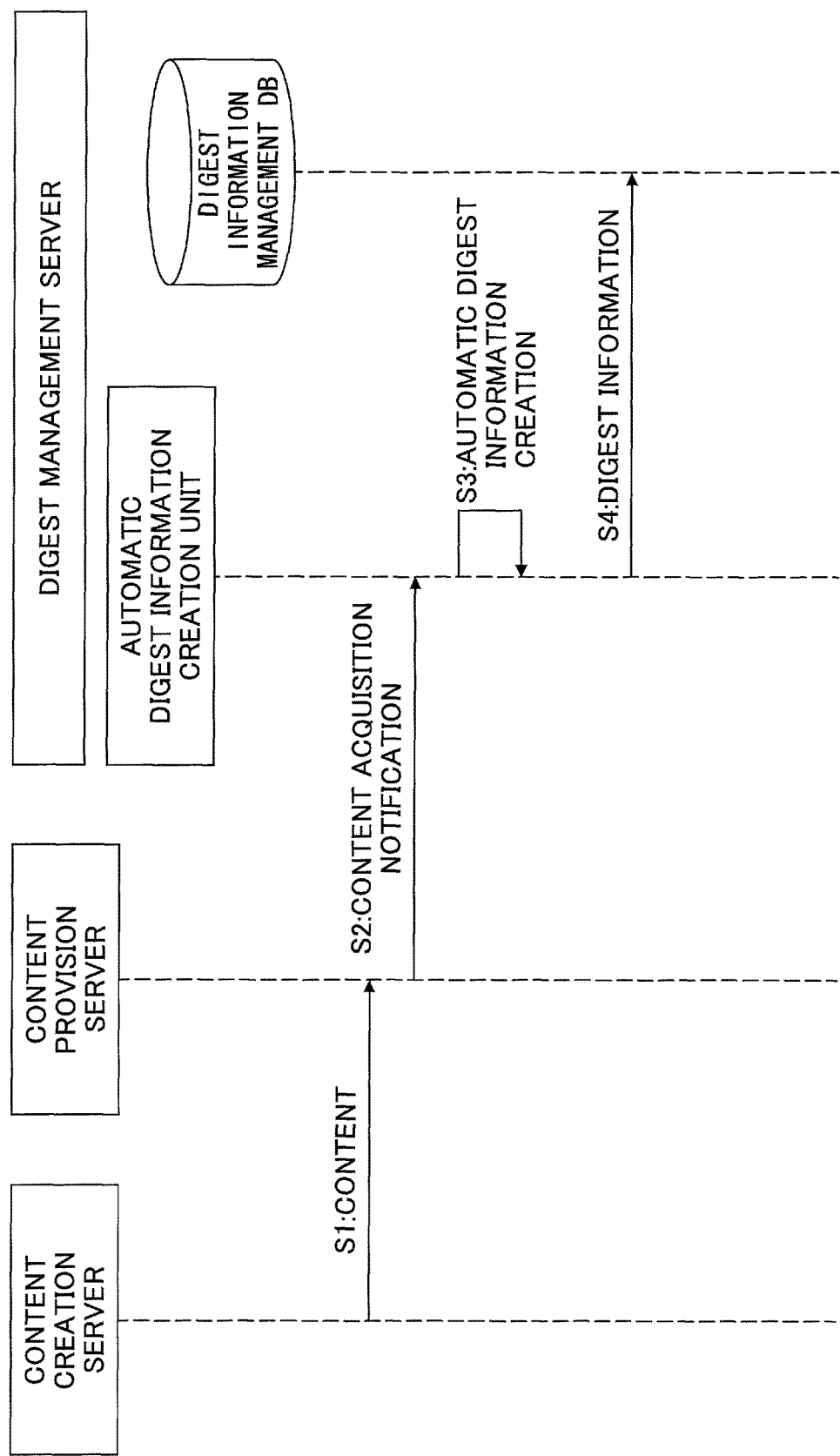
FIG. 26 is a sequence diagram illustrating an example process of automatic creation of the digest information performed by an automatic digest information creation unit.

FIG. 26 is a sequence diagram illustrating an example process of automatic creation of the digest information performed by the automatic digest information creation unit 44. In step S1, the content creation server 12 receives the content from the capturing device 11 or the mobile terminal to create the content. The created content is transmitted to the content provision server 13. In step S2, upon new content being registered, the content provision server 13 transmits a content acquisition notification indicating that the content has been registered in the content provision server 13 to the digest management server 18. In step S3, in response to receiving the content acquisition notification, the automatic digest information creation unit 44 creates the digest information. In step S4, the created digest information is stored in the digest information management DB 4001.

Additionally, the automatic creation of the digest information may be performed at timing when the content creator 5 gives an instruction. For example, the automatic creation of the digest information may be performed at timing when an automatic creation button displayed in the digest information change screen 601 is pushed.

Thus, according to the content provision system 100 of the present embodiment, the digest information can be created without the content creator 5 setting the designated point P.

Third Embodiment

Figure 27:
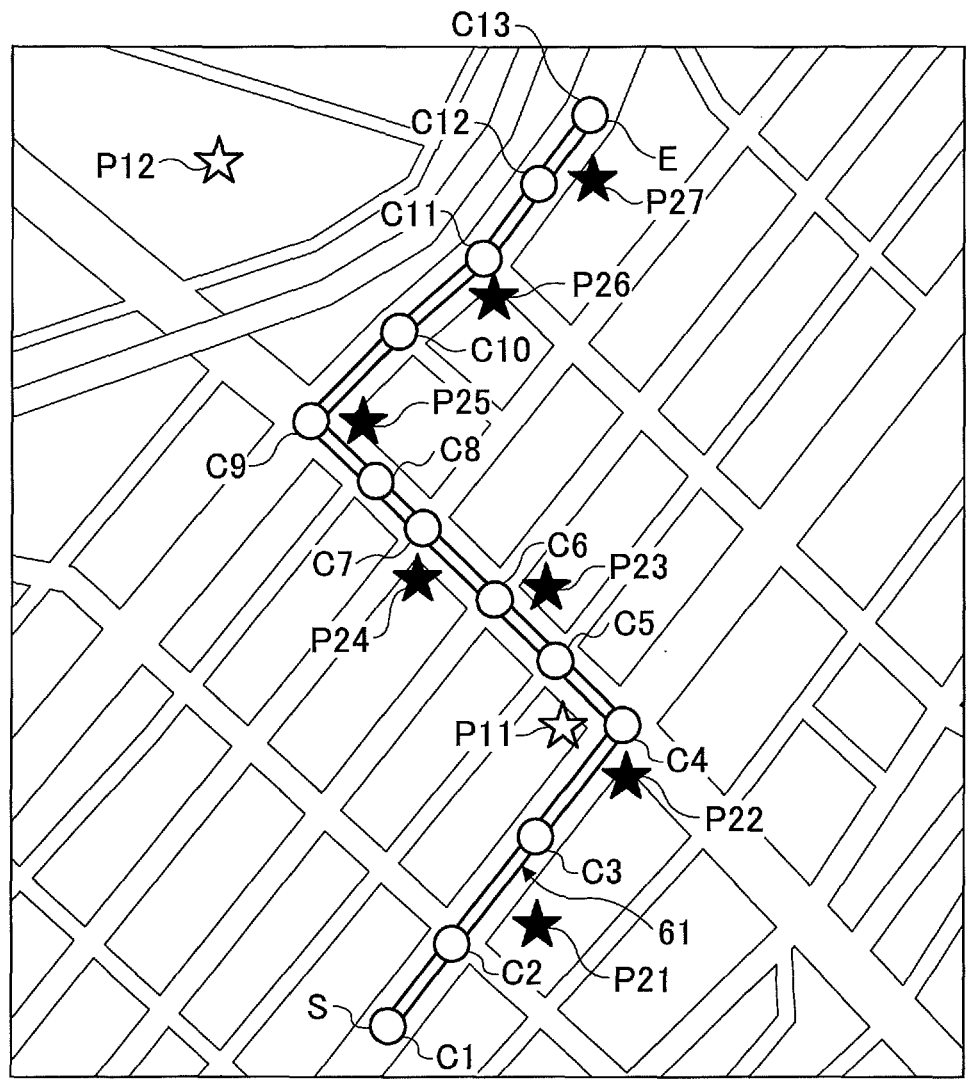
FIG. 27 is a diagram schematically illustrating a plurality of patterns of the digest information set in the content.

In the present embodiment, the content provision system 100 that can set a plurality of patterns of digest information with respect to one content. The pattern means a series of designated points (or a designated point) set with respect to a plurality of spherical images (or a spherical image) included in the content. FIG. 27 is a diagram schematically illustrating a plurality of patterns of the digest information set in the content. In FIG. 27, a combination of the designated points P11 and P12 (white star shaped sign) corresponds to a pattern, while a combination of designated points P21-P27 (black star shaped sign) corresponds to another pattern. That is, the designated points P11 and P12 belong to one group, while the designated points P21-P27 belong to another group. Similarly to a case in the first embodiment, the content creator 5 may set different patterns of designated points P depending on application or target of the content. Or, in a case where the digest information is automatically created like a case of the second embodiment, different patterns of designated points P are set depending on the attribute of the feature.

For example, in FIG. 27, the designated points P11 and P12 are sightseeing spots to call tourists' attention, while the designated points P21-P27 are shops to call women's attention.

The method for creating the digest information may be performed similarly to cases of the first and second embodiments. That is, the content creator 5 sets the designated points P depending on the application or target of the content. The automatic digest information creation unit 44 sets the designated points P by selecting the features depending on the attribute thereof on a pattern-by-pattern basis. The digest information change unit 43 allocates identification information items (digest ID described below) for identifying the respective patterns to the designated points, thereby handling discrete patterns. Alternatively, the content creator 5 may designate the respective identification information items on a pattern-by pattern basis.

For example, the digest information table is shown below in a case where a plurality of patterns of the digest information is set.

TABLE 2

DIGEST INFORMATION TABLE

| CONTENT ID | CONTENT NAME | DIGEST ID | FRAME ID | POLAR COORDINATES | DISPLAY MAGNIFICATION RATE |
|---|---|---|---|---|---|
| C001 | 001-A | D01 | 5 | (r5, θ15, φ15) | 1 |
| C001 | 001-A | D01 | 7 | (r17, θ17, φ17) | 0.5 |
| C001 | 001-A | D02 | 3 | (r23, θ23, φ23) | 3 |
| C001 | 001-A | D02 | 8 | (r28, θ28, φ28) | 2 |
| C001 | 001-A | D02 | 10 | (r210, θ210, φ210) | 0.3 |

In the digest information table shown as table 2, a column of digest ID is added in comparison to table 1. The digest ID is identification information (group information) for identifying the pattern. Since two digest IDs with respect to one content ID are recorded in table 2, the digest reproduction can be performed in two patterns. For example, when "D01" is selected as the digest ID, the user PC 16 performs the digest reproduction under a condition that the designated points P are included only in frames corresponding to the frame IDs of 5 and 7.

The operational process of the digest reproduction may be the same as that shown in FIG. 22. However, in this case, the digest information request unit 35 includes a content ID and the digest ID in the digest information request transmitted in step S2 of FIG. 22. Accordingly, the digest management server 18 transmits the digest information corresponding to the digest ID to the user PC 16.

The user PC 16 transmits the digest ID in response to the end-user selecting a button, etc., provided for sightseeing spots or shops displayed on a reproduction screen of the content. Respective buttons are associated with the digest IDs. The user PC 16 transmits the digest ID associated with the selected button to the digest management server 18.

Therefore, according to the content provision system 100 of the present embodiment, the digest reproduction of one content can be performed in a plurality of patterns.

<Examples of Other Applications>

Herein above, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

For example, the digest management server 18 or the content provision server 13 may transmit the content in which the display ranges of the spherical images have been already set based on the digest information. In this case, the user PC 16 can display the designated points P only by reproducing the content like streaming.

Figure 28:
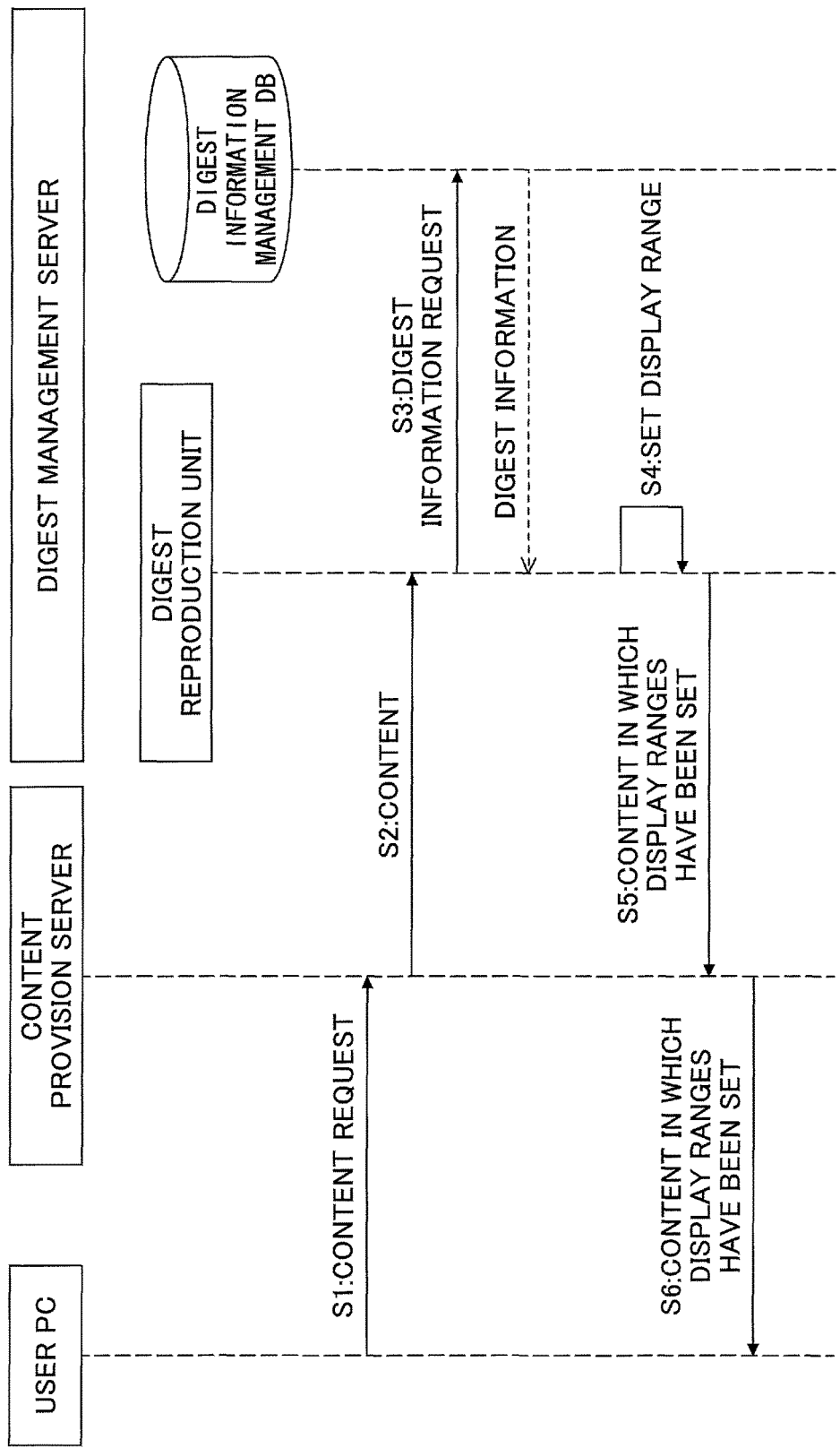
FIG. 28 is a sequence diagram illustrating a process for transmitting the content in which the display ranges of the spherical images have been already set from the content provision server to the user PC.

FIG. 28 is a sequence diagram illustrating a process for transmitting the content in which the display ranges of the spherical images have been already set from the content provision server 13 to the user PC 16. In FIG. 28, the digest management server 18 includes a digest reproduction unit 36. The digest reproduction unit 36 sets the display ranges V1-V13. In step S1, the user PC 16 requests the content provision server 13 to provide the content. In step S2, the content provision server 13 transmits the content requested by the user PC 16 to the digest management server 18. In step S3, the digest reproduction unit 36 of the digest management server 18 retrieves the digest information from the digest information management DB 4001. In step S4, the digest reproduction unit 36 determines the display ranges and the display magnification rates as described with reference to FIG. 23. In step S5, the digest reproduction unit 36 transmits the content in which the display ranges have been set to the content provision server 13. In step S6, the content provision server 13 transmits the content in which the display ranges have been set to the user PC 16.

Also, in this case, the digest management server 18 may transmit only the display ranges V1-V13 to the user PC 16. Thus, time taken for transmitting the spherical images can be shortened.

Also, according to the descriptions of the present embodiment, an arbitrary apparatus having acquired the content and the digest information can perform the digest reproduction. For example, when the digest management server 18 stores the content, the digest reproduction of the content can be performed by connecting a display, etc., to the digest management server 18.

For example, in the embodiments, although the spherical images are included in the content, this is not a limiting example. For example, wide range images that cannot be entirely displayed within the screen of the display may be included in the content. Also, an image other than the spherical image may be included in the spherical images of the content, and the image may be displayed between the spherical images. Further, in a case where the image of the content is the spherical image, a spherical image composed by combining a plurality of images may be used as well as the spherical image captured by the capturing device 11 dedicated for capturing the spherical image. Moreover, the spherical image may be captured by a smartphone to which a specific lens is attached.

Also, the video image includes the video image captured in the sky (during parachuting or paragliding), in the water (in sea or pool) as well as captured on the ground. In a case where the video images other than the video image captured on the ground are used, preferably, height information is added to the images as well as the longitude and the latitude.

Also, in the embodiments, the content creator 5 edits the digest information of the spherical image corresponding to the closest capturing point of the designated point P. However, the digest information other than that of the spherical image corresponding to the closest capturing point of the designated point P may be edited. For example, the content creator 5 may select, in the digest information change screen 601, capturing points to designate corresponding spherical images whose digest information is to be edited. Also, not only the eye direction of the closest capturing point of the designated point P but also the eye directions of a plurality of the capturing points may be adjusted to be directed to the designated point P.

Further, in the functional configuration show in FIG. 6, respective functional blocks are divided in accordance with the functions thereof for convenience of explanation, and that is not a limiting example. Also, data bases stored in the storage unit 1000 and 4000 may be disposed in other unit as long as the content provision system 100 can read/write data therefrom/therein.

Moreover, in FIG. 6, respective functional units are included in the content provision server 13, the digest management server 18, the user PC 16 and the creator PC 19. However, this is not a limiting example. For example, the respective functional units included in the content provision server 13, the digest management server 18, the user PC 16 and the creator PC 19 may be further divided. Also, for example, several functional units may be integrated.

Herein above, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. The present application is based on Japanese Priority Application No. 2015-102622 filed on May 20, 2015, the entire contents of which are hereby incorporated herein by reference.

What is claimed is:

1. A content provision system including an information processing apparatus and a terminal device, the information processing apparatus comprising:
a processor that provides a content that includes a plurality of images respectively captured at discrete capturing locations to the terminal device and retrieves the content from a content storage device for storing the content, and a position information item associated with the content from a position information storage device for storing the position information item, the position information item defining a designated position; and
a transmitter that transmits the retrieved content and the retrieved position information item to the terminal device;

the terminal device comprising:
a receiver that receives the content and the position information item; and
a processor that reproduces the content by successively selecting an image to be displayed from the images included in the content and displaying a partial area of the selected image, the displayed partial area being extracted from the selected image to show a view in a direction of the designated position for at least one of the images that is identified based on a distance between the designated position and a capturing location of the at least one of the images, wherein
the position information item associated with identification information for identifying at least one of the images included in the content is stored in the position information storage device,
the receiver receives the identification information with the position information item,
the processor sets eye directions of images for defining a center of the partial area, at least the eye direction of a first image identified by the identification information being directed to the designated position,
the content includes the first image and a second image displayed after the first image in the reproduction of the content,
the eye direction of the first image is set to be directed to the designated point, and
the eye direction of the second image is set by adjusting an initial eye direction of the second image based on the eye direction of the first image and a distance between a first capturing location corresponding to the first image and a second capturing location corresponding to the second image.

2. The content provision system according to claim 1, wherein
the receiver of the terminal device further receives a display magnification rate associated with the identification information, and
the processor reproduces the content by displaying the first image magnified or reduced at the display magnification rate.

3. The content provision system according to claim 2, wherein
the display magnification rate of the second image is set by adjusting an initial display magnification rate of the second image based on the display magnification rate of the first image and the distance between the first capturing location and the second capturing location.

4. The content provision system according to claim 2, wherein
(A) a first designated point and a second designated point are defined by the position information items,
(B) the content includes the first image, a second image displayed after the first image, and a third image displayed between the first image and the second image in the reproduction of the content,
(C) a distance between a first capturing location corresponding to the first image and the first designated point being less than a first predetermined value, a distance between a second capturing location corresponding to the second image and the second designated point being less than a second predetermined value, a distance between a third capturing location corresponding to the third image and the first designated point being greater than or equal to the first predetermined value, a distance between the third capturing location and the second designated point being greater than or equal to the second predetermined value,
(D) the eye direction of the first image is set to be directed to the first designated point,
(E) the eye direction of the second image is set to be directed to the second designated point, and
(F-1) the eye direction of the third image is set by adding a vector indicating the eye direction of the first image and a vector indicating the eye direction of the second image based on distances between the first capturing location and the third capturing location and the second capturing location and the third capturing location, or
(F-2) the display magnification rate of the third image is set to be a value between the display magnification rate of the first image and the display magnification rate of the second image.

5. The content provision system according to claim 1, wherein the processor sets a reproduction speed of the first image slower than reproduction speed of other images.

6. The content provision system according to claim 1, wherein
group information for identifying a group to which the position information item belongs is further stored in the position information storage device, the group information being associated with the position information item,
the transmitter transmits the position information item designated by the group information, and
the processor of the terminal device sets the display range of the image based on the designated position defined by the position information item designated by the group information.

7. The content provision system according to claim 1, wherein
the processor of the information processing apparatus further detects an object located within a predetermined range around the capturing location of the image included in the content so as to store the position information item of the detected object in the position information storage device, the object being detected based on a map data retrieved from a map data storage device.

8. The content provision system according to claim 1, wherein
the transmitter of the information processing apparatus further transmits a screen to the terminal device, the position information item or a display magnification rate in the content being set in the screen, wherein
the transmitter acquires the position information item and the display magnification rate input by a user of the terminal device through the screen.

9. A method of a content provision system including an information processing apparatus and a terminal device, the method comprising:
providing, by the information processing apparatus, a content that includes a plurality of images respectively captured at discrete capturing locations to the terminal device,
retrieving, by the information processing apparatus, the content from a content storage device for storing the content, and a position information item associated with the content from a position information storage device for storing the position information item, the position information item defining a designated position, and
transmitting the retrieved content and the retrieved position information item to the terminal device;
receiving, by the terminal device, the content and the position information item, and
reproducing the content by successively selecting an image to be displayed from the images included in the content and displaying a partial area of the selected image, the displayed partial area being extracted from the selected image to show a view in a direction of the designated position for at least one of the images that is identified based on a distance between the designated position and a capturing location of the at least one of the images, wherein
the position information item associated with identification information for identifying at least one of the images included in the content is stored in the position information storage device,
the receiving, by the terminal device, includes receiving the identification information with the position information item,
the reproducing, by the terminal device, includes setting eye directions of images for defining a center of the partial area, at least the eye direction of a first image identified by the identification information being directed to the designated position,
the content includes the first image and a second image displayed after the first image in the reproduction of the content,
the eye direction of the first image is set to be directed to the designated point, and
the eye direction of the second image is set by adjusting an initial eye direction of the second image based on the eye direction of the first image and a distance between a first capturing location corresponding to the first image and a second capturing location corresponding to the second image.

\* \* \* \* \*